(12) United States Patent
Quan et al.

(10) Patent No.: US 10,313,060 B2
(45) Date of Patent: Jun. 4, 2019

(54) DATA TRANSMISSION METHOD AND APPARATUS FOR LOSSLESS TRANSMISSION

(71) Applicant: Huawei Technologies Co., Ltd., Shenzhen (CN)

(72) Inventors: Wei Quan, Beijing (CN); Jian Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 160 days.

(21) Appl. No.: 15/151,184

(22) Filed: May 10, 2016

(65) Prior Publication Data

US 2016/0277154 A1 Sep. 22, 2016

Related U.S. Application Data

(63) Continuation of application No. PCT/CN2013/086864, filed on Nov. 11, 2013.

(51) Int. Cl.
*H04W 4/00* (2018.01)
*H04L 1/16* (2006.01)
*H04L 12/801* (2013.01)
*H04W 72/04* (2009.01)

(52) U.S. Cl.
CPC .......... *H04L 1/1621* (2013.01); *H04L 1/1678* (2013.01); *H04L 47/34* (2013.01); *H04W 72/042* (2013.01); *H04W 72/0413* (2013.01)

(58) Field of Classification Search
CPC .................................................. H04L 1/1621
See application file for complete search history.

(56) References Cited

U.S. PATENT DOCUMENTS

2003/0157927 A1* 8/2003 Yi ................. H04L 63/0457
                                                   455/411
2010/0165937 A1* 7/2010 Yi ................. H04W 76/062
                                                   370/329

(Continued)

FOREIGN PATENT DOCUMENTS

CN          101267440 A    9/2008
CN          101795494 A    8/2010
                (Continued)

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)," 3GPP TS 36.300, V11.7.0, pp. 1-209, 3$^{rd}$ Generation Partnership Project, Valbonne, France (Sep. 2013).

(Continued)

*Primary Examiner* — Gerald A Smarth
(74) *Attorney, Agent, or Firm* — Leydig, Voit & Mayer, Ltd.

(57) ABSTRACT

Embodiments of the present invention disclose a data transmission method and apparatus. The data transmission method includes: performing, by a Packet Data Convergence Protocol PDCP entity, lossless transmission on PDCP protocol data units PDUs or PDCP service data units SDUs, where each of the PDCP PDUs or the SDUs is associated with one serial number. In this embodiment, during lossless transmission, no data packet is lost, thereby ensuring communication quality in an inter-station carrier aggregation scenario and achieving an optimization objective.

20 Claims, 10 Drawing Sheets

(56) References Cited

U.S. PATENT DOCUMENTS

| | | | |
|---|---|---|---|
| 2010/0304733 A1* | 12/2010 | Yi | H04L 1/1874 |
| | | | 455/422.1 |
| 2011/0188408 A1 | 8/2011 | Yi et al. | |
| 2012/0281564 A1 | 11/2012 | Zhang et al. | |
| 2013/0070682 A1 | 3/2013 | Kim et al. | |
| 2013/0176988 A1 | 7/2013 | Wang et al. | |
| 2014/0362767 A1* | 12/2014 | Xu | H04L 1/18 |
| | | | 370/328 |
| 2015/0257078 A1 | 9/2015 | Cho | |

FOREIGN PATENT DOCUMENTS

| | | |
|---|---|---|
| CN | 101911546 A | 12/2010 |
| CN | 102223670 A | 10/2011 |
| CN | 102265700 A | 11/2011 |
| CN | 102939729 A | 2/2013 |
| CN | 102958102 A | 3/2013 |
| CN | 103039109 A | 4/2013 |
| CN | 103201977 A | 7/2013 |
| WO | 2013131319 A1 | 9/2013 |

OTHER PUBLICATIONS

"3rd Generation Partnership Project; Technical Specification Group Radio Access Network; Evolved Universal Terrestrial Radio Access (E-UTRA); Packet Data Convergence Protocol (PDCP) specification (Release 11)," 3GPP TS 36.323, V11.2.0, pp. 1-27, $3^{rd}$ Generation Partnership Project, Valbonne, France (Mar. 2013).

* cited by examiner

DATA TRANSMISSION METHOD AND APPARATUS FOR LOSSLESS TRANSMISSION

CROSS-REFERENCE

This application is a continuation of International Patent Application No. PCT/CN2013/086864, filed on Nov. 11, 2013, which is hereby incorporated by reference in its entirety.

TECHNICAL FIELD

The present invention relates to the field of data processing technologies, and in particular, to a data transmission method and apparatus.

BACKGROUND

Currently, an LTE system supports only carrier aggregation that is within a same station, and in this carrier aggregation scenario, one radio bearer corresponds to one packet data convergence protocol(PDCP) entity and one radio link control(RLC) entity. To increase application scenarios of carrier aggregation, inter-station carrier aggregation is put forward. A difference of inter-station carrier aggregation from intra-station carrier aggregation includes: A same radio bearer may correspond to one PDCP entity and multiple RLC entities, and moreover, on a network side, the multiple RLC entities may be separately located on different stations.

In this way, an original data transmission process applicable to intra-station carrier aggregation needs to be optimized.

SUMMARY

In view of this, an objective of embodiments of the present invention is to provide a data transmission method and apparatus, to optimize a data transmission process.

To achieve the foregoing objective, the following technical solutions are provided in the embodiments of the present invention:

According to a first aspect of the embodiments of the present invention, a data transmission method is provided, including:

performing, by a Packet Data Convergence Protocol PDCP entity, lossless transmission on PDCP protocol data units PDUs or PDCP service data units SDUs, where each of the PDCP PDUs or the SDUs is associated with one serial number.

With reference to the first aspect, in a first possible implementation manner, the performing lossless transmission on PDCP SDUs includes: submitting all PDCP SDUs whose serial number values are consecutive to a higher layer in ascending order of the serial number values.

With reference to the first possible implementation manner of the first aspect, in a second possible implementation manner, the submitting all PDCP SDUs whose serial number values are consecutive to a higher layer in ascending order of the serial number values includes: when a lossless sending condition is met, submitting all the PDCP SDUs whose serial number values are consecutive to the higher layer in ascending order of the serial number values, where the lossless sending condition includes at least one of a first lossless sending condition and a second lossless sending condition, the first lossless sending condition includes: a received PDCP PDU is submitted not because of low-layer re-establishment, and the second lossless sending condition includes: a received PDCP PDU is submitted because of low-layer re-establishment, and a lossless indication is received, where the lossless indication is used to indicate lossless transmission.

With reference to the second possible implementation manner of the first aspect, in a third possible implementation manner, the method further includes: when a lossy sending condition is met, submitting, by the PDCP entity, all the PDCP SDUs to the higher layer in ascending order of the serial number values, where the lossy sending condition includes: a received PDCP PDU is submitted because of low-layer re-establishment, and a lossless indication is not received.

With reference to the second possible implementation manner of the first aspect or the third possible implementation manner of the first aspect, in a fourth possible implementation manner, the method further includes receiving the lossless indication.

With reference to the first aspect, in a fifth possible implementation manner, the performing lossless transmission on PDCP PDUs includes:

after receiving a PDCP re-establishment indication, determining, by the PDCP entity, whether a lossless indication is received, where the lossless indication is used to indicate lossless transmission; and when it is determined that the lossless indication has been received, submitting, by the PDCP entity, PDCP PDUs that have been associated with serial numbers before re-establishment to a lower layer in ascending order of serial number values and by starting from a PDCP PDU that has the smallest serial number value and whose successful transmission has not been acknowledged by the lower layer before re-establishment; or when it is determined that the lossless indication has been received, submitting, by the PDCP entity to a lower layer in ascending order of serial number values, all PDCP PDUs that have been associated with serial numbers SNs before re-establishment, but whose successful transmission has not been acknowledged by the lower layer.

With reference to the fifth possible implementation manner of the first aspect, in a sixth possible implementation manner, the method further includes: when it is determined that the lossless indication is not received, performing, by the PDCP entity, lossy transmission, where the lossy transmission includes: submitting all PDCP PDUs that have been associated with SNs before re-establishment to the lower layer in ascending order of serial number values and by starting from a PDCP PDU that is after a PDCP PDU that has the largest serial number value and whose successful transmission has been acknowledged by the lower layer; or discarding all the PDCP PDUs that have been associated with the SNs before re-establishment; or discarding all PDCP PDUs that have been sent to the lower layer before re-establishment; or discarding all PDCP SDUs that are received from a higher layer before re-establishment.

With reference to the fifth possible implementation manner of the first aspect or the sixth possible implementation manner of the first aspect, in a seventh possible implementation manner, the method further includes: receiving a successful sending acknowledgment indication sent by the lower layer, where each PDCP PDU successfully sent by the lower layer corresponds to one successful sending acknowledgment indication.

With reference to any one of the fifth to the seventh possible implementation manners of the first aspect, in an eighth possible implementation manner, the method further includes: receiving the lossless indication.

With reference to the fourth possible implementation manner of the first aspect or the eighth possible implementation manner of the first aspect, in a ninth possible implementation manner, the lossless indication is carried by using a radio resource control RRC message.

With reference to the ninth possible implementation manner of the first aspect, in a tenth possible implementation manner, the RRC message includes at least one of a switching command and an RRC reconfiguration message.

With reference to the fifth possible implementation manner of the first aspect, in an eleventh possible implementation manner, when a PDCP status report required parameter is true, the PDCP entity determines that the lossless indication is received; otherwise, the PDCP entity determines that the lossless indication is not received.

With reference to any one of the fifth to the eleventh possible implementation manners of the first aspect, in a twelfth possible implementation manner, the method further includes: discarding a PDCP PDU whose successful transmission has been acknowledged by the lower layer, and a PDCP SDU corresponding to the PDCP PDU whose successful transmission has been acknowledged by the lower layer.

According to a second aspect of the embodiments of the present invention, a data transmission method is provided, including:

receiving, by a PDCP entity on a user equipment UE side, a first PDCP PDU from a lower layer, where a serial number value that the first PDCP PDU is associated with is M; and when a condition of starting a packet discarding detection timer is met, starting, by the PDCP entity on the UE side, the packet discarding detection timer, where the condition of starting the packet discarding detection timer includes: it is detected that the first PDCP PDU is a non-consecutive PDCP PDU in a receiver window, and being non-consecutive includes: at least one second PDCP PDU having a serial number less than the serial number M is not received.

With reference to the second aspect, in a first possible implementation manner, the method further includes:

when a stopping condition is met, stopping, by the PDCP entity on the UE side, the packet discarding detection timer, where the stopping condition includes at least: all missing second PDCP PDUs whose serial number values are less than the serial number M in the receiver window are successfully received.

With reference to the second aspect or the first possible implementation manner of the second aspect, in a second possible implementation manner, the method further includes:

when the packet discarding detection timer expires, generating, by the PDCP entity on the UE side, a PDCP status report and sending the PDCP status report to a network side; or when the packet discarding detection timer expires, submitting, by the PDCP entity on the UE side, PDCP SDUs included in PDCP PDUs having serial numbers less than or equal to M to a higher layer in ascending order of the serial number values; and submitting PDCP SDUs included in all PDCP PDUs whose serial number values are greater than M and consecutive to the higher layer in ascending order of the serial number values.

With reference to the second aspect, in a third possible implementation manner, the condition of starting the packet discarding detection timer further includes: the packet discarding detection timer is not running.

With reference to the second aspect or the first possible implementation manner of the second aspect, in a fifth possible implementation manner, the packet discarding detection timer is associated with the PDCP PDU whose serial number is M, or the packet discarding detection timer is associated with a PDCP PDU whose serial number is M+1.

With reference to any one of the second aspect to the fifth possible implementation manner of the second aspect, in a sixth possible implementation manner, at least one of the packet discarding detection timer and duration is configured by the network side.

With reference to any one of the second aspect to the sixth possible implementation manner of the second aspect, in a seventh possible implementation manner, the PDCP status report includes a PDCP PDU not successfully sent by the network side or a PDCP PDU successfully sent by the network side.

With reference to the second aspect, in an eighth possible implementation manner, the method further includes:

maintaining, by the PDCP entity on the UE side, an unmatched number corresponding to an RLC entity specified by a network side, where the maintaining includes:

when the PDCP entity on the UE side receives a missing PDCP PDU, and the missing PDCP PDU is associated with the RLC entity specified by the network side, updating the corresponding unmatched number.

With reference to the eighth possible implementation manner of the second aspect, in a ninth possible implementation manner, the method further includes:

when a trigger condition is met, sending, by the PDCP entity on the UE side, a PDCP matching status report to the network side, where the trigger condition includes at least one of the following: an unmatched number is greater than a preset threshold, a difference between unmatched numbers is greater than a preset threshold, and a difference between an unmatched number and an unmatched number of a reference RLC configured by the network side are greater than or equal to a preset threshold; and the PDCP matching status report includes at least one of the unmatched number corresponding to the RLC entity specified by the network side, the difference between unmatched numbers, and the difference between an unmatched number and the unmatched number of the reference RLC configured by the network side.

According to a third aspect of the embodiments of the present invention, a data transmission apparatus is provided, including:

a first Packet Data Convergence Protocol PDCP unit, configured to perform lossless transmission on PDCP protocol data units PDUs or PDCP service data units SDUs, where each of the PDCP PDUs or the SDUs is associated with one serial number.

With reference to the third aspect, in a first possible implementation manner, in an aspect of performing lossless transmission on the PDCP SDUs, the first PDCP unit is specifically configured to submit all PDCP SDUs whose serial number values are consecutive to a higher layer in ascending order of the serial number values.

With reference to the first possible implementation manner of the third aspect, in a second possible implementation manner, in an aspect of submitting all the PDCP SDUs whose serial number values are consecutive to the higher layer in ascending order of the serial number values, the first PDCP unit is specifically configured to: when a lossless sending condition is met, submit all the PDCP SDUs whose serial number values are consecutive to the higher layer in ascending order of the serial number values, where the lossless sending condition includes at least one of a first lossless sending condition and a second lossless sending condition, the first lossless sending condition includes: a received PDCP PDU is submitted not because of low-layer re-establishment, and the second lossless sending condition includes: a received PDCP PDU is submitted because of low-layer re-establishment, and a lossless indication is received, where the lossless indication is used to indicate lossless transmission.

With reference to the second possible implementation manner of the third aspect, in a third possible implementation manner, the apparatus further includes: a second PDPCP unit, configured to: when a lossy sending condition is met, submit all the PDCP SDUs to the higher layer in ascending order of the serial number values, where the lossy sending condition includes: a received PDCP PDU is submitted because of low-layer re-establishment, and a lossless indication is not received.

With reference to the second possible implementation manner of the third aspect or the third possible implementation manner of the third aspect, in a fourth possible implementation manner, the apparatus further includes a first receiving unit, configured to receive the lossless indication.

With reference to the third aspect, in a fifth possible implementation manner, in an aspect of performing lossless transmission on the PDCP PDUs, the first PDCP unit is specifically configured to: after receiving a PDCP re-establishment indication, determine whether a lossless indication is received, where the lossless indication is used to indicate lossless transmission; and when it is determined that the lossless indication has been received, submit PDCP PDUs that have been associated with serial numbers before re-establishment to a lower layer in ascending order of serial number values and by starting from a PDCP PDU that has the smallest serial number value and whose successful transmission has not been acknowledged by the lower layer before re-establishment; or when it is determined that the lossless indication has been received, submit, to a lower layer in ascending order of serial number values, all PDCP PDUs that have been associated with serial numbers SNs before re-establishment, but whose successful transmission has not been acknowledged by the lower layer.

With reference to the fifth possible implementation manner of the third aspect, in a sixth possible implementation manner, the apparatus further includes a third PDCP unit, configured to: when it is determined that the lossless indication is not received, perform lossy transmission, where the lossy transmission includes: submitting all PDCP PDUs that have been associated with SNs before re-establishment to the lower layer in ascending order of serial number values and by starting from a PDCP PDU that is after a PDCP PDU that has the largest serial number value and whose successful transmission has been acknowledged by the lower layer; or discarding all the PDCP PDUs that have been associated with the SNs before re-establishment; or discarding all PDCP PDUs that have been sent to the lower layer before re-establishment; or discarding all PDCP SDUs that are received from a higher layer before re-establishment.

With reference to the fifth possible implementation manner of the third aspect or the sixth possible implementation manner of the third aspect, in a seventh possible implementation manner, the apparatus further includes: a second receiving unit, configured to receive a successful sending acknowledgment indication sent by the lower layer, where each PDCP PDU successfully sent by the lower layer corresponds to one successful sending acknowledgment indication.

With reference to any one of the fifth to the seventh possible implementation manners of the third aspect, in an eighth possible implementation manner, the apparatus further includes: receiving the lossless indication.

With reference to the fourth possible implementation manner of the third aspect or the eighth possible implementation manner of the third aspect, in a ninth possible implementation manner, the lossless indication is carried by using a radio resource control RRC message.

With reference to the ninth possible implementation manner of the third aspect, in a tenth possible implementation manner, the RRC message includes at least one of a switching command and an RRC reconfiguration message.

With reference to the fifth possible implementation manner of the third aspect, in an eleventh possible implementation manner, when a PDCP status report required parameter is true, a PDCP entity determines that the lossless indication is received; otherwise, a PDCP entity determines that the lossless indication is not received.

With reference to any one of the fifth to the eleventh possible implementation manners of the third aspect, in a twelfth possible implementation manner, the apparatus further includes: a discarding unit, configured to discard a PDCP PDU whose successful transmission has been acknowledged by the lower layer, and a PDCP SDU corresponding to the PDCP PDU whose successful transmission has been acknowledged by the lower layer.

According to a fourth aspect of the embodiments of the present invention, a data transmission apparatus is provided, including:

a PDCP unit, configured to receive a first PDCP PDU from a lower layer, where a serial number value that the first PDCP PDU is associated with is M; and a starting unit, configured to: when a condition of starting a packet discarding detection timer is met, start the packet discarding detection timer, where the condition of starting the packet discarding detection timer includes: it is detected that the first PDCP PDU is a non-consecutive PDCP PDU in a receiver window, and being non-consecutive includes: at least one second PDCP PDU having a serial number less than the serial number M is not received.

With reference to the fourth aspect, in a first possible implementation manner, the apparatus further includes:

a stopping unit, configured to: when a stopping condition is met, stop the packet discarding detection timer, where the stopping condition includes at least: all missing second PDCP PDUs whose serial number values are less than the serial number M in the receiver window are successfully received.

With reference to the fourth aspect or the first possible implementation manner of the fourth aspect, in a second possible implementation manner, the apparatus further includes:

a first expiration processing unit, configured to: when the packet discarding detection timer expires, generate a PDCP status report and send the PDCP status report to a network side; or a second expiration processing unit, configured to: when the packet discarding detection timer expires, submit PDCP SDUs included in PDCP PDUs having serial numbers less than or equal to M to a higher layer in ascending order of the serial number values; and a third expiration processing unit, configured to submit PDCP SDUs included in all PDCP PDUs whose serial number values are greater than M and consecutive to the higher layer in ascending order of the serial number values.

With reference to the fourth aspect, in a fourth possible implementation manner, the condition of starting the packet discarding detection timer further includes: the packet discarding detection timer is not running.

With reference to the fourth aspect or the first possible implementation manner of the fourth aspect, in a fifth possible implementation manner, the packet discarding detection timer is associated with the PDCP PDU whose serial number is M, or the packet discarding detection timer is associated with a PDCP PDU whose serial number is M+1.

With reference to any one of the fourth aspect to the fifth possible implementation manner of the fourth aspect, in a sixth possible implementation manner, the PDCP status report includes a PDCP PDU not successfully sent by the network side or a PDCP PDU successfully sent by the network side.

With reference to any one of the fourth aspect to the sixth possible implementation manner of the fourth aspect, in a seventh possible implementation manner, the apparatus further includes a maintenance unit, configured to maintain unmatched numbers corresponding to RLC entities specified by the network side, where the maintaining includes: when a PDCP entity on a UE side receives a missing PDCP PDU, and the missing PDCP PDU is associated with the RLC entity specified by the network side, updating the corresponding unmatched number.

With reference to the fourth aspect, in an eighth possible implementation manner, the apparatus further includes: a PDCP matching status report sending unit, configured to: when a trigger condition is met, send, by the PDCP entity on the UE side, a PDCP matching status report to the network side, where the trigger condition includes at least one of the following: an unmatched number is greater than a preset threshold, a difference between unmatched numbers is greater than a preset threshold, and a difference between an unmatched number and an unmatched number of a reference RLC configured by the network side are greater than or equal to a preset threshold; and the PDCP matching status report includes at least one of the unmatched number corresponding to the RLC entity specified by the network side, the difference between unmatched numbers, and the difference between an unmatched number and the unmatched number of the reference RLC configured by the network side.

According to a fifth aspect of the embodiments of the present invention, a data transmission apparatus is provided, including a processor and a memory, where the processor performs, by running a software program stored in the memory and invoking data stored in the memory, at least the following step: performing lossless transmission on PDCP protocol data units PDUs or PDCP service data units SDUs, where each of the PDCP PDUs or the SDUs is associated with one serial number.

According to a sixth aspect of the embodiments of the present invention, a data transmission apparatus is provided, including a processor and a memory, where the processor performs, by running a software program stored in the memory and invoking data stored in the memory, at least the following steps: receiving a first PDCP PDU from a lower layer, where a serial number value that the first PDCP PDU is associated with is M; and when a condition of starting a packet discarding detection timer is met, starting, by a PDCP entity on a UE side, the packet discarding detection timer, where the condition of starting the packet discarding detection timer includes: it is detected that the first PDCP PDU is a non-consecutive PDCP PDU in a receiver window, and being non-consecutive includes: at least one second PDCP PDU having a serial number less than the serial number M is not received.

It can be seen that, in the embodiments, during lossless transmission, no data packet is lost, thereby ensuring communication quality in an inter-station carrier aggregation scenario and achieving an optimization objective.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
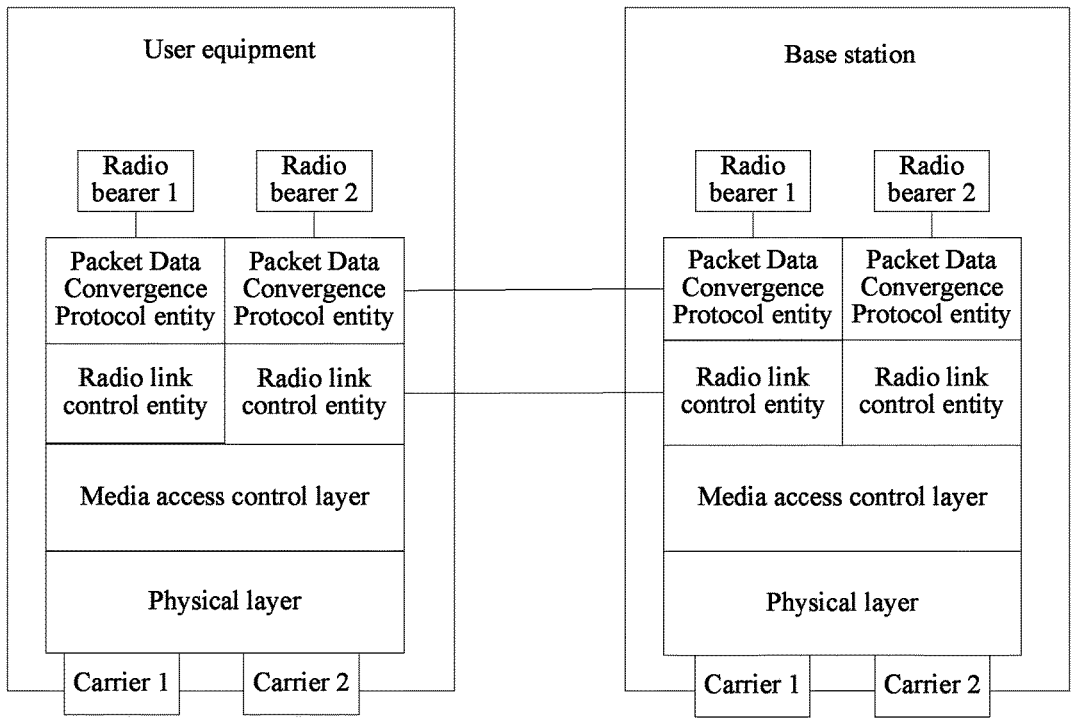
FIG. 1 is a schematic diagram of an intra-station carrier aggregation scenario according to an embodiment of the present invention.

In an existing intra-station carrier aggregation scenario, for a case in which one radio bearer corresponds to one PDCP entity and one RLC entity, refer to FIG. 1. In an inter-station carrier aggregation scenario, a case in which a same radio bearer corresponds to one PDCP entity and two RLC entities, and the two RLC entities are separately located at different stations: a primary base station (MeNB) and a secondary base station (SeNB) is shown in FIG. 2 (in FIG. 2, downlink offloading is used as an example, which is merely for an exemplary purpose and does not constitute any limitation on the present invention).

Figure 2:
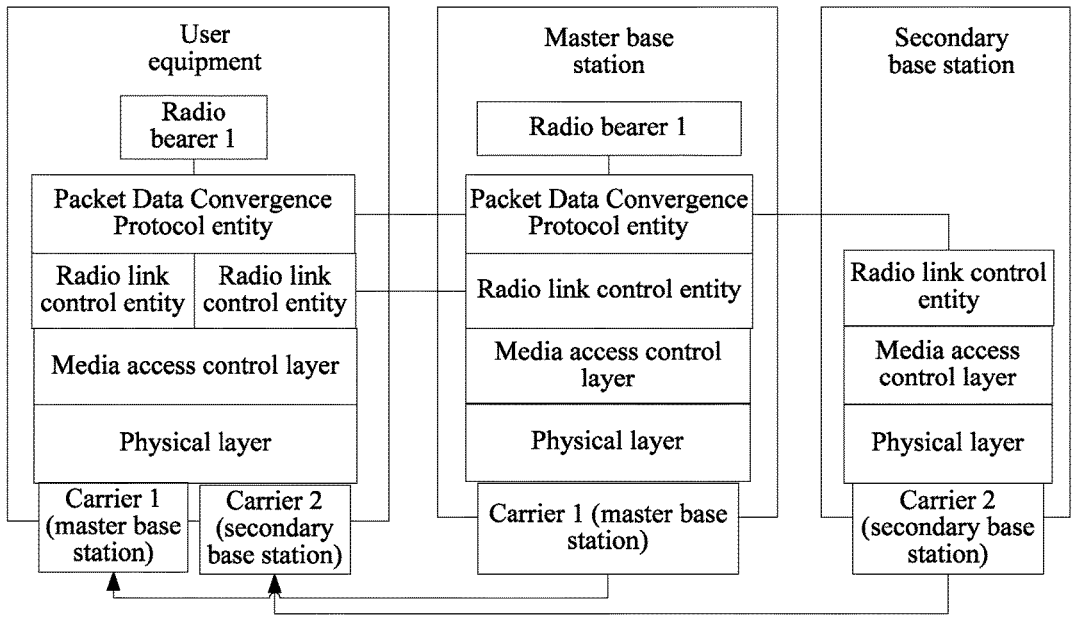
FIG. 2 is a schematic diagram of an inter-station carrier aggregation scenario according to an embodiment of the present invention.

It can be seen from FIG. 2 that, a radio bearer 1 on a user equipment (UE) side corresponds to one PDCP entity and two RLC entities; and a radio bearer 1 on a (primary) base station side corresponds to one PDCP entity and two RLC entities. Moreover, the two RLC entities are located at different stations. Actually, a same radio bearer may correspond to more than two RLC entities. For ease of description, in this specification, the technical solutions are described by using an example in which a same radio bearer corresponds to one PDCP entity and two RLC entities.

In the inter-station carrier aggregation scenario, one of aspects needing to be optimized includes: How the PDCP entity implements submitting of data packets in order. For the PDCP entity, a data packet that the PDCP entity submits to an upper layer (for example, an IP layer) is a PDCP SDU (service data unit), and a data packet that the PDCP entity submits to a lower layer (for example, an RLC layer/entity) is a PDCP protocol data unit (PDU).

To implement submitting data packets by the PDCP entity in order, an embodiment of the present invention provides a data transmission method, which may include the following step:

The PDCP entity performs lossless transmission on PDCP PDUs or PDCP SDUs, where each of the PDCP PDUs or SDUs is associated with one serial number.

Specifically, the serial number may be a sequence number (SN), and may be a COUNT, which is not limited herein.

In this embodiment, during lossless transmission, no data packet is lost, thereby ensuring communication quality in an inter-station carrier aggregation scenario and achieving an optimization objective.

The following describes, by using a downlink as an example, how to implement lossless transmission when data packets are submitted to a higher layer (upwards).

It may be understood that, a processing method for an uplink is similar.

In intra-station carrier aggregation, an RLC entity ensures that data received from a lower layer (for example, a MAC layer) is submitted to a PDCP entity in order and in a lossless manner, and generally, as long as the PDCP entity submits the data upwards in the sequence in which the RLC entity submits the data, submitting in order can be ensured.

In inter-station carrier aggregation, it is assumed that, a PDCP entity corresponding to a radio bearer is on a station 1, the radio bearer corresponds two RLC entities, and the two RLC entities are separately located on the station 1 and a station 2. Although each RLC entity can separately ensure that data packets are submitted in order and in a lossless manner, from the perspective of a PDCP layer, the data packets may not be submitted in order. The reason is that, for example, assuming that one RLC entity sends data packets 1, 3, and 5 in order, and the other RLC entity sends packets 2, 4, and 6 in order, a sequence of data packets received by the PDCP entity may be 1, 3, 5, 2, 4, and 6. In this case, if the PDCP entity performs upward submitting in an existing manner according to a sequence in which the data packets are submitted by the RLC entities, it cannot be ensured that the data packets are submitted to an upper layer in order. In addition, a data packet transmitted between two stations may also be lost. As a result, the PDCP entity cannot receive some data packets.

Figure 3:
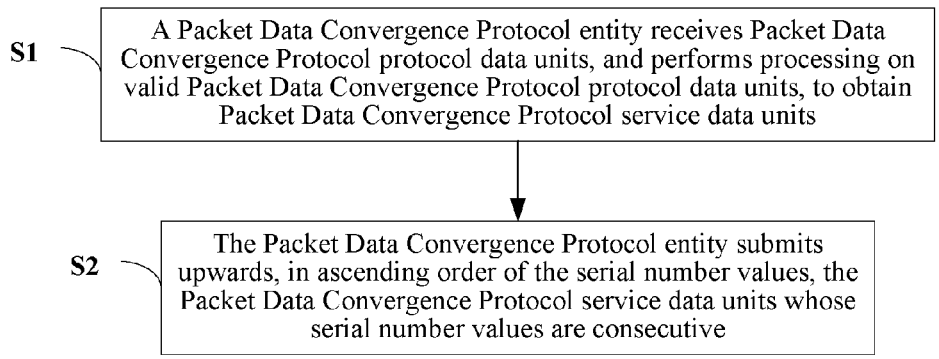
FIG. 3 is a flowchart of a data transmission method according to an embodiment of the present invention.

Referring to FIG. 3, the foregoing transmission method may specifically include the following step:

S2: The PDCP entity submits upwards, in ascending order of serial number values, PDCP SDUs whose serial number values are consecutive.

For example, assuming that one RLC entity sends data packets 1, 3, and 5 in order of serial number values, and the other RLC entity sends data packets 2, 4, and 6 in order of serial number values, a sequence of data packets received by a peer-end PDCP entity from the two RLC entities may be 1, 3, 5, 2, 4, and 6. In step S2, the submitting upwards, in ascending order of serial number values, PDCP SDUs whose serial number values are consecutive is submitting PDCP SDUs to the upper layer in order of 1, 2, 3, 4, 5, and 6. In this way, it can be implemented that the data packets are submitted to the upper layer in order.

That is, in this embodiment, because upward submitting is performed in ascending order of the serial number values, and what are submitted are the PDCP SDUs whose serial number values are consecutive, it can be implemented that the PDCP SDUs are submitted upwards in order and in a lossless manner.

In another embodiment of the present invention, the foregoing method may further include the following step:

S1: The PDCP entity receives PDCP PDUs (which are submitted by an RLC entity), and performs processing on valid PDCP PDUs, to obtain PDCP SDUs.

In this embodiment, the PDCP entity may be a PDCP entity on a UE side, or may be a PDCP entity on a (primary) base station side.

The PDCP PDU received by the PDCP entity includes an serial number(SN). After receiving the PDCP PDU, the PDCP entity determines whether the PDCP PDU is valid data according to the SN number of the PDCP PDU; and if yes, the data packet is stored, and processing such as decryption and decompression may be performed on the valid PDCP PDU according to configuration, to obtain a PDCP SDU.

However, if the PDCP PDU is invalid data (for example, the PDCP PDU falls out of a receiver window or is a repeated data packet), the PDCP PDU is discarded.

On how to determine whether a PDCP PDU is valid data and how to process a valid PDCP PDU, details are not described herein again.

It should be noted that, in an LTE system, the RLC entity may be categorized into a UM-mode RLC entity and an AM-mode RLC entity, where the AM mode has a retransmission mechanism, and in a normal case, it is ensured that no packet is lost (for example, except a re-establishment scenario, serial number values of PDCP PDUs submitted to a PDCP layer are consecutive); while in the UM mode, there is no retransmission mechanism for the RLC entity, and therefore, it is not ensured that no packet is lost.

For example, the PDCP entity corresponds to the AM-mode RLC entity. Although lossless transmission does not need to be performed generally, in a scenario such as switching, processing by using which packet discarding is prevented may be further needed, that is, hitless switching is ensured. Switching leads to re-establishment, which includes PDCP layer re-establishment and/or low-layer re-establishment (for example, RLC layer re-establishment).

To implement at least the hitless switching, in another embodiment of the present invention, the foregoing step S2 may specifically include: when a lossless submitting condition is met, the PDCP entity submits all the PDCP SDUs whose serial number values are consecutive to the higher layer in ascending order of the serial number values.

The foregoing lossless submitting condition may include at least one of a first lossless transmission condition and a second lossless transmission condition.

The first lossless transmission condition may include: a received PDCP PDU is submitted not because of low-layer (lower layers) re-establishment.

The second lossless transmission condition may include: a received PDCP PDU is submitted because of low-layer re-establishment, and the higher layer (for example, an RRC layer) indicates lossless transmission. That the higher layer indicates losslessness transmission may be also referred to as transmission is indicated.

Figure 4:
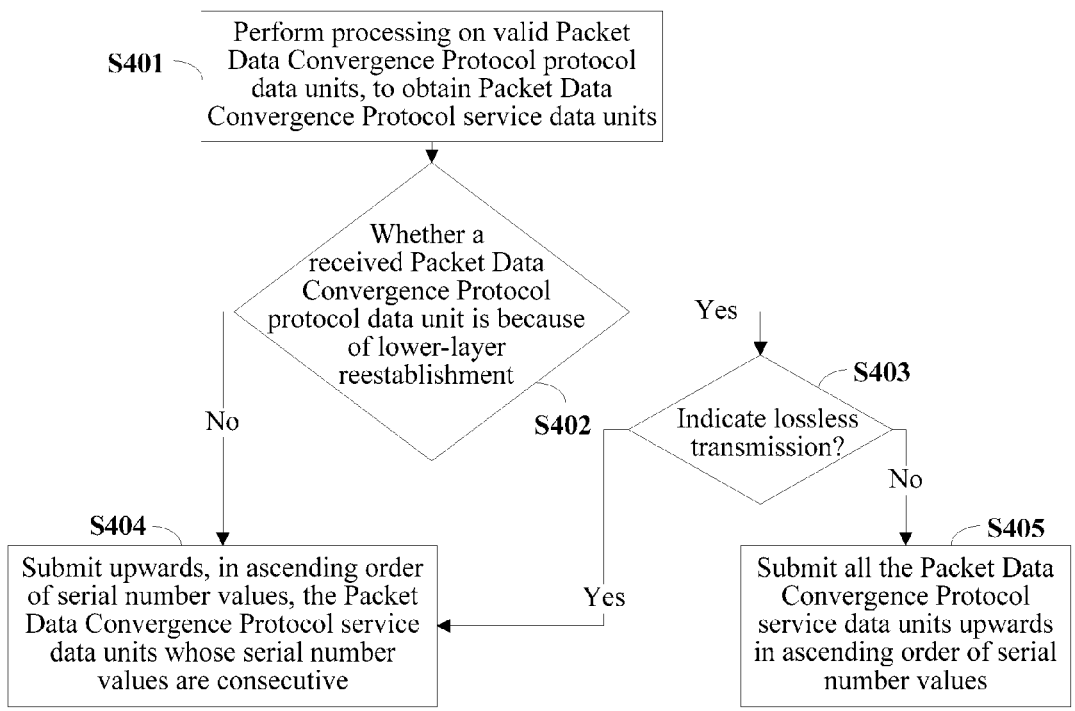
FIG. 4 is another flowchart of a data transmission method according to an embodiment of the present invention.

FIG. 4 shows a specific process based on the lossless submitting condition, which may include:

S401: A PDCP entity receives PDCP PDUs, and performs processing on valid PDCP PDUs, to obtain PDCP SDUs.

S402: The PDCP entity determines whether a received PDCP PDU is submitted from a lower layer because of lower-layer (lower layers) re-establishment; and if yes, perform step S403, or if not, perform step S404.

S403: The PDCP entity determines whether a higher layer indicates lossless transmission (that is, during PDCP re-establishment, no data packet is lost); if yes, perform step S404, or if not, perform step S405.

S404: The PDCP entity performs the lossless transmission.

S405: The PDCP entity submits all stored PDCP SDUs to an upper layer in ascending order of serial number values.

Step S405 may be considered as lossy transmission in which the PDCP entity does not need to wait until serial number values are consecutive before sending in ascending order, that is, although serial number values of PDCP SDUs stored by the PDCP entity are non-consecutive, the PDCP SDUs are still transmitted.

It can be known according to FIG. 4 that, an execution condition (a lossy submitting condition) corresponding to step S405 includes: a received PDCP PDU is submitted because of low-layer re-establishment, and the higher layer does not indicate the lossless transmission.

In another embodiment of the present invention, the higher layer (for example, an RRC layer) may deliver the lossless indication, to indicate the lossless transmission.

Therefore, the foregoing method may further include the following step: receiving the lossless indication.

The lossless indication may be carried by using an RRC (radio resource control) message.

To be more specific, the foregoing RRC message may include at least one of a switching command and an RRC reconfiguration message.

A specific receiving manner may be: a base station sends the lossless indication to UE by using the RRC message, and after receiving the lossless indication, a higher layer (for example, an RRC layer) on a UE side notifies the PDCP entity to use the lossless indication.

Alternatively, the lossless transmission may also be indicated implicitly. For example, when a PDCP status report required parameter (status report required) is true, it is determined that the higher layer indicates the lossless transmission; otherwise, it is determined that the higher layer does not indicate the lossless transmission. The PDCP status report required parameter may carried in the RRC message, for example, the switching command. Therefore, it may also be considered that the lossless indication is carried in the RRC message implicitly.

Alternatively, in another embodiment of the present invention, the foregoing lossless submitting condition may include only: a received PDCP PDU is submitted not because of lower-layer (lower layers) re-establishment.

It should be noted that, the transmission method provided by all of the foregoing embodiments may be also applied to another scenario such as an intra-station carrier aggregation scenario and a single-carrier scenario besides an inter-station carrier aggregation scenario.

Figure 5:
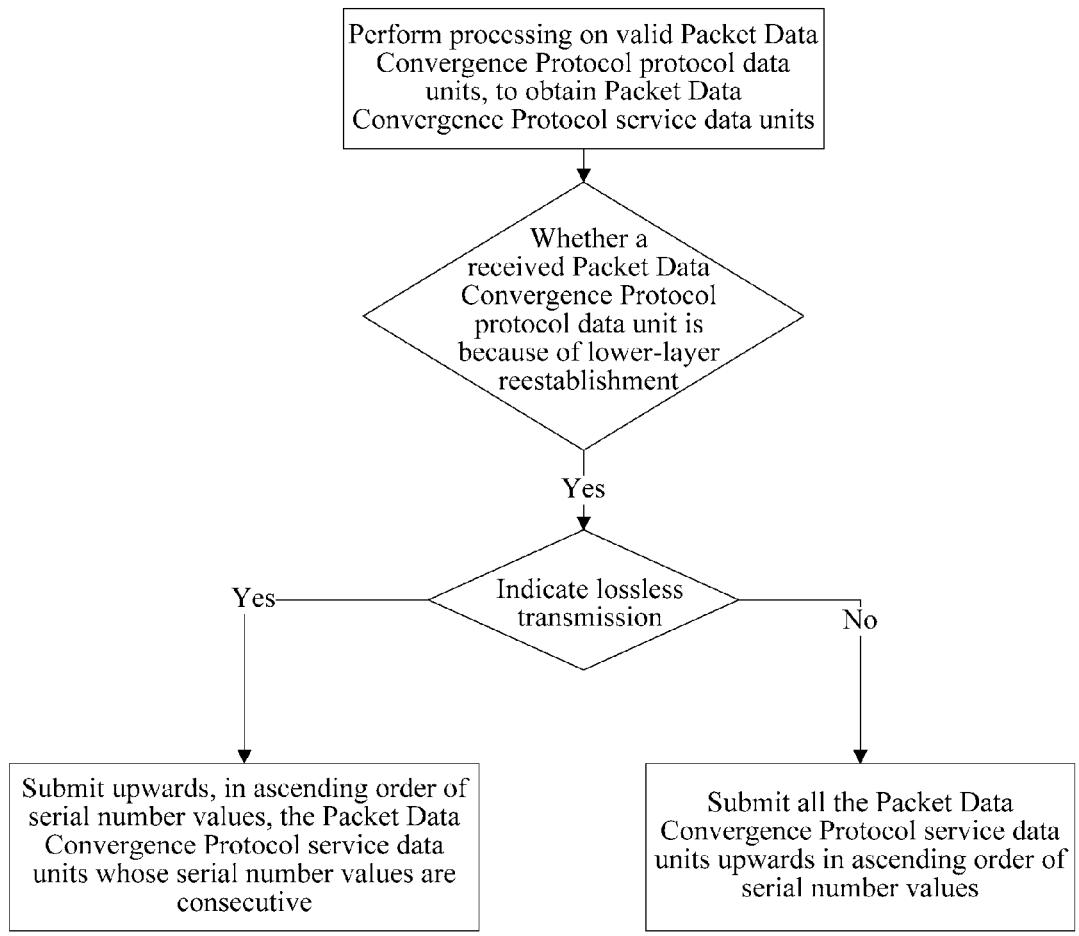
FIG. 5 is still another flowchart of a data transmission method according to an embodiment of the present invention.

For example, when the transmission method is used in another scenario besides the inter-station carrier aggregation scenario, during re-establishment, a process shown in FIG. 5 may be performed.

After describing how to implement lossless transmission when data packets are submitted to a higher layer, the following describes how to implement lossless transmission when data packets are submitted to a lower layer.

In an existing LTE system, a PDCP entity receives PDCP SDUs from a higher layer, associates the PDCP SDUs with SN numbers, and performs processing such as encapsulation, to obtain PDCP PDUs; and then submits the PDCP PDUs downwards in ascending order of serial numbers. Because the PDCP entity associates the PDCP SDUs with SNs, generally, serial numbers of the PDCP PDUs submitted downwards in order are certainly consecutive, that is, lossless.

In some special scenarios such as switching (re-establishment), UE performs lossless transmission by default. The purpose of this embodiment is to introduce a lossless indication, so that the UE may perform the lossless transmission according to the lossless indication.

Figure 6:
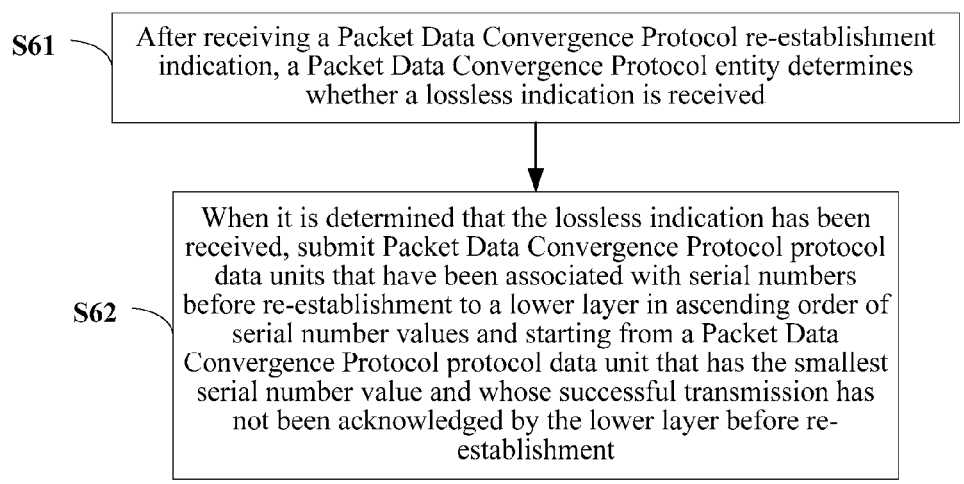
FIG. 6 is still another flowchart of a data transmission method according to an embodiment of the present invention.
Figure 7:
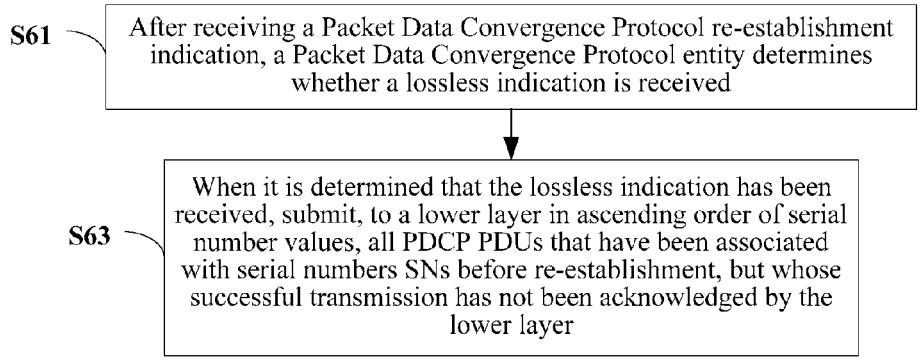
FIG. 7 is still another flowchart of a data transmission method according to an embodiment of the present invention.

Referring to FIG. 6 and FIG. 7, the performing lossless transmission on PDCP PDUs may specifically include:

S61: After receiving a PDCP re-establishment indication, the PDCP entity determines whether a lossless indication is received, where the lossless indication is used to indicate lossless transmission.

S62: When it is determined that the lossless indication has been received, the PDCP entity submits PDCP PDUs that have been associated with serial numbers before re-establishment to a lower layer in ascending order of serial number values and by starting from a PDCP PDU that has the smallest serial number value and whose successful transmission has not been acknowledged by the lower layer before re-establishment.

After the PDCP entity submits the PDCP PDUs to the lower layer, the lower layer (an RLC layer) performs processing such as segmentation and/or in-series connection on the PDCP PDUs (RLC SDUs for the RLC layer), and obtains RLC PDUs by processing and sends the RLC PDUs to a MAC layer. The RLC layer receives a response that is fed back by a peer-end RLC layer and that indicates that the RLC PDUs are successfully sent or a response that is fed back by the MAC layer to the RLC layer and that indicates that the RLC PDUs are successfully sent. The RLC layer then feeds back a successful sending acknowledgment indication to the PDCP entity. That is, for each PDCP PDU successfully sent by the lower layer, the RLC layer, also called an RLC entity, feeds back a successful sending acknowledgment indication to the PDCP entity.

Therefore, the PDCP entity can know a PDCP PDU whose successful transmission has not been acknowledged by the lower layer and a PDCP PDU whose successful transmission has been acknowledged by the lower layer.

During re-establishment, the PDCP entity may submit PDCP PDUs that have been associated with serial numbers before re-establishment to a lower layer in ascending order of serial number values and by starting from a PDCP PDU that has the smallest serial number value and whose successful transmission has not been acknowledged by the lower layer before re-establishment.

For example, before re-establishment, the PDCP entity sends PDCP PDUs whose serial number values are 1 to 8, and PDCP PDUs whose serial number values are 9 to 16 have not been submitted to the lower layer. According to feedback from the RLC entity, it has been acknowledged that PDCP PDUs whose serial number values are 1, 3, 5, and 7 are successfully sent.

It can be known from this that, a PDCP PDU that has the smallest serial number value and whose successful transmission has not been acknowledged by the lower layer before re-establishment is a PDCP PDU whose serial number value is 2.

During re-establishment, PDCP PDUs whose serial number values are 2 to 16 are submitted to the lower layer in ascending order of the serial number values and by starting from the PDCP PDU whose serial number value is 2.

Alternatively,

S63: When it is determined that the lossless indication has been received, the PDCP entity submits, to a lower layer in ascending order of serial number values, all PDCP PDUs that have been associated with serial numbers SNs before re-establishment, but whose successful transmission has not been acknowledged by the lower layer.

The foregoing example is still used for step S63. Before re-establishment, the PDCP entity sends PDCP PDUs whose serial number values are 1 to 8, and PDCP PDUs whose serial number values are 9 to 16 have not been submitted to the lower layer. According to feedback from the RLC entity, it has been acknowledged that PDCP PDUs whose serial number values are 1, 3, 5, and 7 are successfully sent.

During re-establishment, PDCP PDUs whose serial number values are 2, 4, 6, and 8 are submitted to the lower layer (that is, retransmission), and PDCP PDUs whose serial number values are 9 to 16 are submitted to the lower layer (first transmission).

It should be noted that, during description of submitting data packets upwards, the lossless indication is also involved in some embodiments. The lossless indication in this embodiment may be the same as the lossless indication in the foregoing embodiment. That is, UE receives one lossless indication and the lossless indication may be used to instruct to perform lossless transmission to the higher layer and the lower layer.

Certainly, the lossless indication may be also divided into a first lossless indication and a second lossless indication, where the first lossless indication is used to instruct to perform lossless transmission during submit to a higher layer, and the second lossless indication is used to instruct to perform lossless transmission during submit to the lower layer. A person skilled in the art may design with flexibility according to a need, and details are not described herein again.

Figure 8:
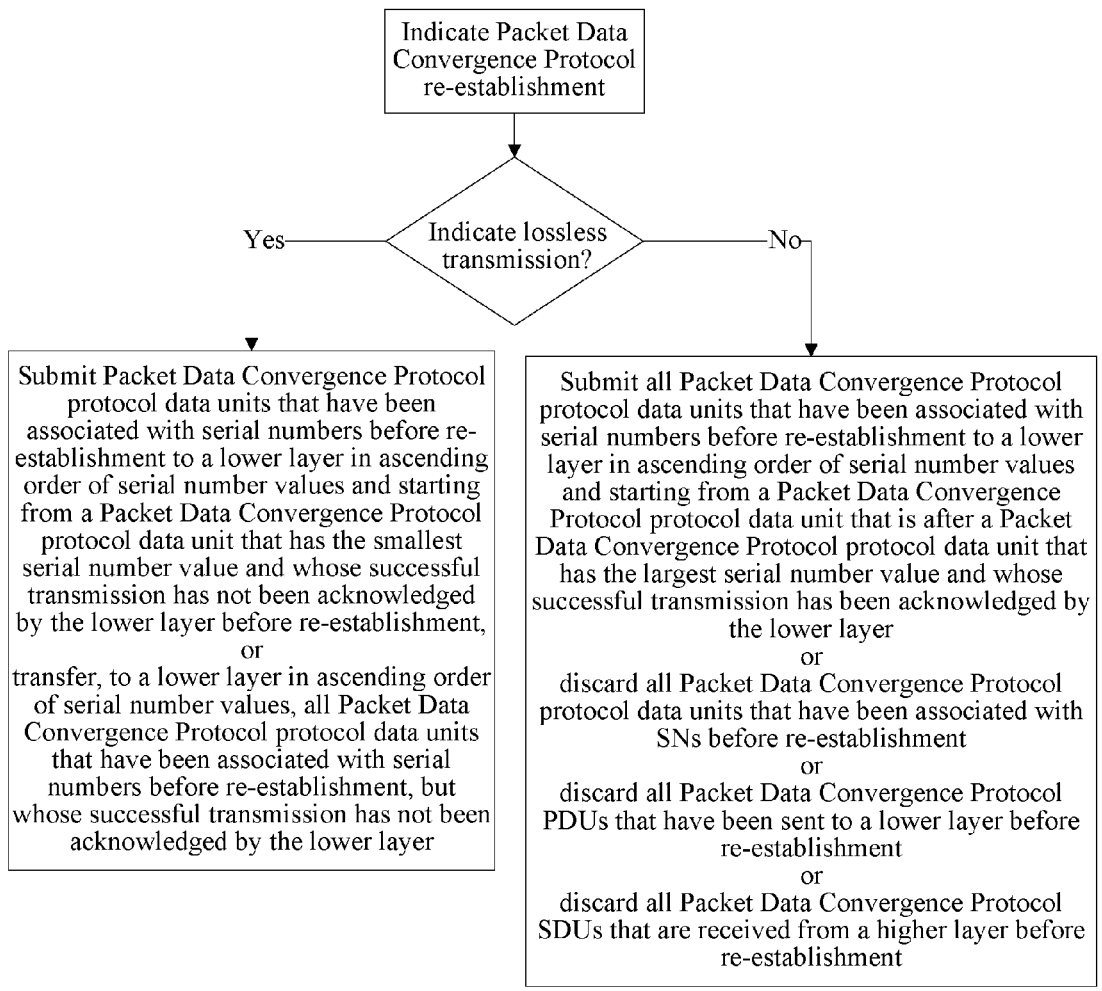
FIG. 8 is still another flowchart of a data transmission method according to an embodiment of the present invention.

In another embodiment of the present invention, referring to FIG. 8, the foregoing method may further include: when it is determined that the lossless indication is not received, the PDCP entity performs lossy transmission.

The lossy transmission may include at least the following four manners:

Manner 1: All PDCP PDUs that have been associated with SNs before re-establishment are submitted to the lower layer in ascending order of serial numbers and by starting from a PDCP PDU that is after a PDCP PDU that has the largest serial number value and whose successful transmission has been acknowledged by the lower layer.

The foregoing example is still used. Before re-establishment, the PDCP entity sends PDCP PDUs whose serial number values are 1 to 8, and PDCP PDUs whose serial number values are 9 to 16 have not been submitted to the lower layer. According to feedback from the RLC entity, it has been acknowledged that PDCP PDUs whose serial number values are 1, 3, 5, and 7 are successfully sent.

A PDCP PDU that has the largest serial number value and whose successful transmission has been acknowledged by the lower layer is a PDCP PDU whose serial number value is 7. A PDCP PDU that is after the PDCP PDU is a PDCP PDU whose serial number value is 8.

During re-establishment, in the manner 1, PDCP PDUs whose serial number values are 8 to 16 are submitted to the lower layer in ascending order of the serial number values and by starting from the PDCP PDU whose serial number value is 8.

Manner 2: All PDCP PDUs that have been associated with SNs before re-establishment are discarded.

The foregoing example is still used. In the manner 2, PDCP PDUs whose serial number values are 1 to 16 are discarded.

Manner 3: All PDCP PDUs that have been sent to the lower layer before re-establishment are discarded.

The foregoing example is still used. In the manner 3, PDCP PDUs whose serial number values are 1 to 8 are discarded.

Manner 4: All PDCP SDUs that are received from a higher layer before re-establishment are discarded.

In another embodiment of the present invention, the method in all of the foregoing embodiments may further include: receiving a successful sending acknowledgment indication sent by the lower layer, where each PDCP PDU successfully sent by the lower layer corresponds to one successful sending acknowledgment indication.

In another embodiment of the present invention, the method in all of the foregoing embodiments may further include:

during RLC re-establishment, receiving successful sending acknowledgment indications fed back by the RLC entity for all PDCP PDUs that have been successfully sent by the lower layer, but that are not indicated.

Consider the following case: the PDCP entity sends PDCP PDUs whose serial number values are 1 to 8 to the RLC entity, where PDCP PDUs whose serial number values are 1 to 5 are successfully sent, but before re-establishment, the RLC entity only has time to indicate to the PDCP entity that PDCP PDUs whose serial number values are 1 and 2 are successfully sent, but has no time to indicate that PDCP PDUs whose serial number values are 3 to 5 are successfully sent.

In this case, during the RLC re-establishment, the RLC entity feeds the successful sending acknowledgment indications to the PDCP entity, to indicate that PDCP PDUs whose serial number values are 3 to 5 are successfully sent.

In another embodiment of the present invention, the method in all of the foregoing embodiments may further include: discarding a PDCP PDU whose successful transmission has been acknowledged by the lower layer, and a PDCP SDU corresponding to the PDCP PDU whose successful transmission has been acknowledged by the lower layer.

In another embodiment of the present invention, the method in all of the foregoing embodiments may further include: receiving the lossless indication.

The lossless indication is carried by using an RRC (radio resource control) message.

To be more specific, the foregoing RRC message may include at least one of a switching command and an RRC reconfiguration message.

A specific receiving manner may be: a base station sends the lossless indication to UE by using the RRC message, and after receiving the lossless indication, a higher layer (for example, an RRC layer) on a UE side notifies the PDCP entity to use the lossless indication.

Alternatively, the lossless transmission may also be indicated implicitly. For example, when a PDCP status report required parameter (status report required) is true, it is determined that the higher layer indicates the lossless transmission; otherwise, it is determined that the higher layer does not indicate the lossless transmission. The PDCP status report required parameter may carried in the RRC message, for example, the switching command. Therefore, it may also be considered that the lossless indication is carried in the RRC message implicitly.

After a discard timer (Discard Timer) associated with a PDCP SDU expires, or after a PDCP status report is received, the PDCP entity can perform a discarding operation on the PDCP SDU and a corresponding PDCP PDU. In addition, after the PDCP entity discards the PDCP SDU and the corresponding PDCP PDU, if the PDCP PDU corresponding to the PDCP SDU has been submitted to the lower layer, the PDCP entity may further indicate to the lower layer that the PDCP PDU has been discarded by the higher layer.

However, a current PDCP status report may be transmitted only during switching, and therefore, if switching is not performed for a long time, UE may temporarily store a large quantity of data packets for a long time until a timer expires. However, duration configured for the discard timer may be relatively long, for example, 1500 milliseconds, or infinity. In this case, if a packet is discarded after the discard timer expires, the UE may temporarily store a large quantity of data packets for a long time.

To resolve the foregoing problem, the present invention provides a data transmission method, which may include:

after the RLC entity detects a successfully sent RLC SDU, feeding a successful sending acknowledgment indication back to indicate to the PDCP entity that the PDCP PDU is successfully sent.

To be more specific, after the PDCP entity submits the PDCP PDUs to the lower layer, the lower layer (an RLC layer) performs processing such as segmentation and/or in-series connection on the PDCP PDUs (which are RLC SDUs for the RLC layer), and obtains RLC PDUs by processing and sends the RLC PDUs to a MAC layer. The RLC layer receives a response that is fed back by a peer-end RLC layer and that indicates that the RLC PDUs are successfully sent or a response that is fed back by the MAC layer to the RLC layer and that indicates that the RLC PDUs are successfully sent. The RLC layer then feeds back a successful sending acknowledgment indication to the PDCP entity.

Figure 9:
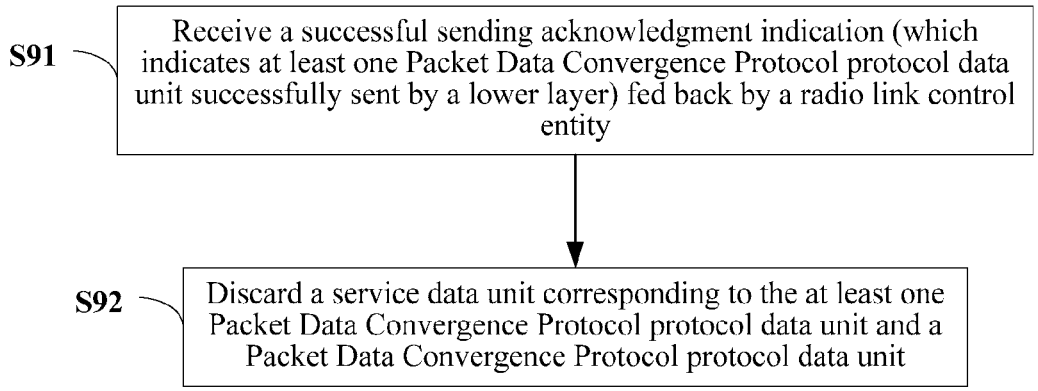
FIG. 9 is still another flowchart of a data transmission method according to an embodiment of the present invention.

If one RLC SDU is associated with one PDCP PDU, for a PDCP entity, referring to FIG. 9, steps performed by the PDCP entity may include:

S91: The PDCP entity receives the successful sending acknowledgment indication fed back by the RLC entity. The successful sending acknowledgment indication is used to indicate at least one PDCP PDU (RLC SDU) successfully sent by the lower layer.

S92: The PDCP entity discards a PDCP SDU corresponding to the at least one PDCP PDU and a corresponding PDCP PDU.

It can be seen that, in this embodiment, the RLC entity feeds the successful sending acknowledgment indication back, and once receiving the indication, the PDCP entity discards a corresponding data packet, and do not wait for the PDCP status report or do not wait until the discard timer expires, to discard a packet, so that a large quantity of data packets are not temporarily stored for a long time, thereby resolving a problem.

In another embodiment of the present invention, the method in all of the foregoing embodiments may further include:

during RLC re-establishment, receiving, by the PDCP entity, successful sending acknowledgment indications fed back by the RLC entity for all PDCP PDUs that have been successfully sent by the lower layer, but that are not indicated.

Consider the following case: the PDCP entity sends PDCP PDUs whose serial number values are 1 to 8 to the RLC entity, where PDCP PDUs whose serial number values are 1 to 5 are successfully sent, but before re-establishment, the RLC entity only has time to indicate to the PDCP entity that PDCP PDUs whose serial number values are 1 and 2 are successfully sent, but has no time to indicate that PDCP PDUs whose serial number values are 3 to 5 are successfully sent.

In this case, during the RLC re-establishment, the RLC entity feeds the successful sending acknowledgment indications to the PDCP entity, to indicate that PDCP PDUs whose serial number values are 3 to 5 are successfully sent.

That is, the foregoing PDCP PDUs successfully sent by the lower layer may include PDCP PDUs that are successfully sent by the lower layer before the RLC re-establishment, but whose successful transmission are not indicated.

In an existing LTE system, after receiving data packets, some PDCP entities directly submit the data packets in order of receiving, which may cause the following problem: data packets whose serial numbers are 1 and 3 arrive before a data packet whose serial number is 2, and because the PDCP entities directly submit the data packets without waiting, it may cause unnecessary packet discard.

However, some PDCP entities detect whether a packet is lost, and after it is detected that a packet is lost, the PDCP entities keep waiting until the lost packet arrives. This leads to an increased delay that exists when data packets are submitted upwards.

Figure 10:
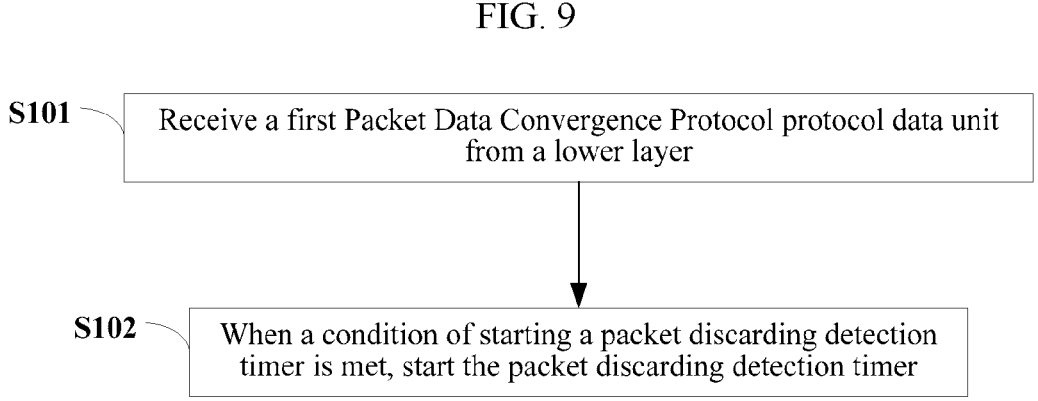
FIG. 10 is still another flowchart of a data transmission method according to an embodiment of the present invention.

To resolve the foregoing problem, an embodiment provides a data transmission method. Referring to FIG. 10, the data transmission method may include:

S101: A PDCP entity on a user equipment (UE) side receives a first PDCP PDU from a lower layer. For ease of subsequent description, it is assumed that a serial number value that the first PDCP PDU is associated with is M.

S102: When a condition of starting a packet discarding detection timer is met, the PDCP entity on the UE side starts the packet discarding detection timer.

The condition of starting the packet discarding detection timer includes: it is detected that the first PDCP PDU is a non-consecutive PDCP PDU in a receiver window, and being non-consecutive includes: at least one second PDCP PDU having a serial number less than the serial number M is not received, where the serial number may be a COUNT or a SequenceNumber.

For example, the PDCP entity on the UE side has received PDCP PDUs whose serial number values are 1 and 4, and has not received PDCP PDUs whose serial number values are 2 and 3. The serial numbers 2 and 3 are less than the serial number value 4, and therefore, a PDCP PDU whose serial number value is 4 is a non-consecutive PDCP PDU, and the PDCP PDUs whose serial number values are 2 and 3 are second PDCP PDUs.

To be more specific, the packet discarding detection timer is associated with a non-consecutive PDCP PDU whose serial number is M, or the packet discarding detection timer may be associated with a PDCP PDU whose serial number is M+1. The foregoing example is still used, and the packet discarding detection timer is associated with the PDCP PDU whose serial number is 4 or is associated with a PDCP PDU whose serial number is 5.

That the foregoing packet discarding detection timer is associated with a PDCP PDU may be also understood as the packet discarding detection timer is associated with a serial number of a PDCP PDU. There is no difference in performing subsequent operations and solutions between the two.

In another embodiment of the present invention, when the starting condition is met, the packet discarding detection timer is started, so that a PDCP may receive, in a running period of the timer, at least one second PDCP PDU that is not yet received and that has a serial number less than the serial number M, rather than immediately determine that the at least one second PDCP PDU has been lost, so that a possibility that unnecessary packet discard occurs due to no waiting may be reduced. Meanwhile, with intervention of the timer, waiting to receive at least one second PDCP PDU all the time is also avoided, so that a delay of submitting a data packet upwards is decreased.

In another embodiment of the present invention, the foregoing condition of starting the packet discarding detection timer may further include: the packet discarding detection timer is not running, which includes stopping or expiring.

For example, if the PDCP entity on the UE side receives PDCP PDUs whose serial number values are 1, 4, 5, 8, and 9, a packet discarding detection timer associated with a PDCP PDU whose serial number value is 4 or 5 is started. If at least one of PDCP PDUs whose serial number values are 5 to 7 is still not received after the packet discarding detection timer expires or stops, a packet discarding detection timer for a PDCP PDU whose serial number value is 8 or 9 is started then.

In another embodiment of the present invention, in the transmission method in all of the foregoing embodiments, at least one of the packet discarding detection timer and duration may be configured by a network side (a base station side).

The configuring the packet discarding detection timer may refer to configuring whether to start the packet discarding detection timer when the condition of starting the packet discarding detection timer is met.

Figure 11:
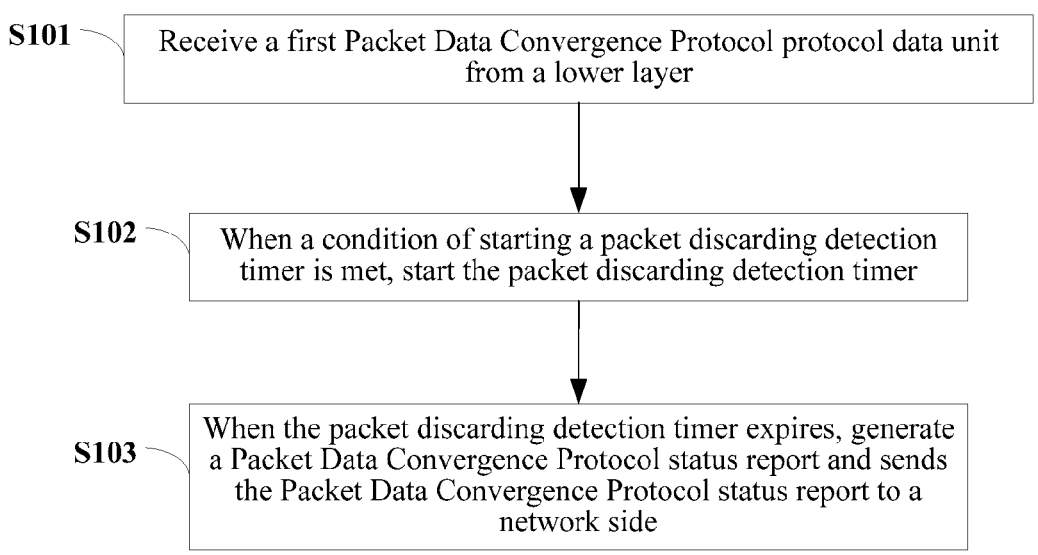
FIG. 11 is still another flowchart of a data transmission method according to an embodiment of the present invention.
Figure 12:
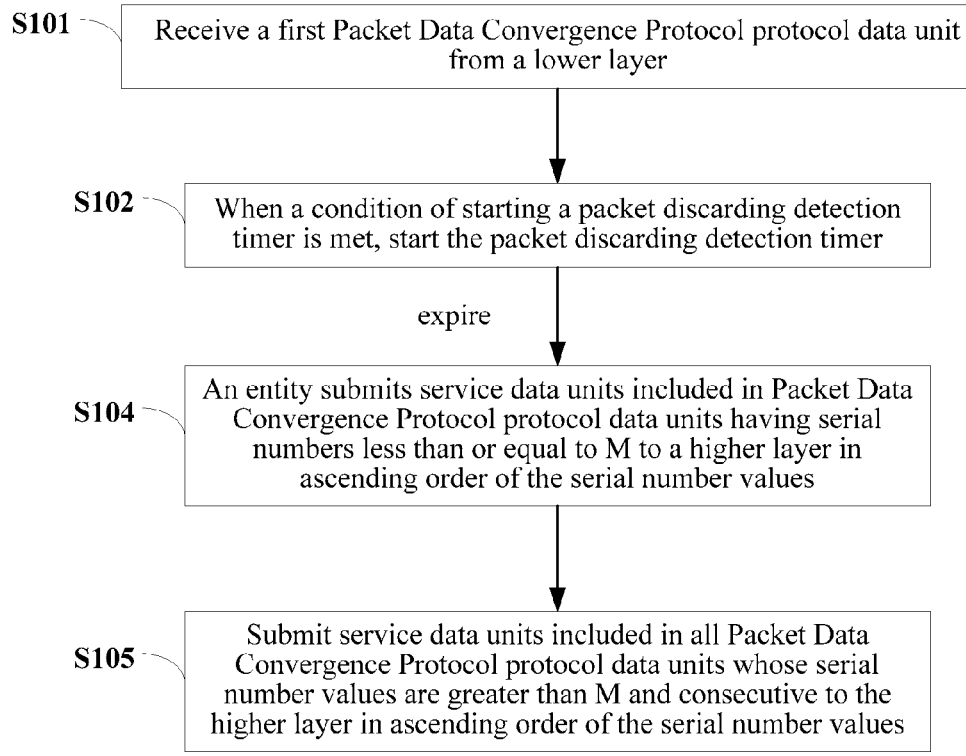
FIG. 12 is still another flowchart of a data transmission method according to an embodiment of the present invention.

In another embodiment of the present invention, referring to FIG. 11 and FIG. 12, when the packet discarding detection timer expires, the method may further include the following steps:

S103: The PDCP entity on the UE side generates a PDCP status report and sends the PDCP status report to a network side.

The PDCP status report includes a PDCP PDU not successfully sent by the network side and/or a PDCP PDU successfully sent by the network side. In an inter-station carrier aggregation scenario, after receiving the PDCP status report, the network side may perform retransmission processing and may also adjust a volume of data sent by using RLC entities of different stations.

The PDCP status report is applied to switching. In this embodiment, an application scenario of the status report is extended.

And/or,

S104: The PDCP entity on the UE side submits PDCP SDUs included in PDCP PDUs having serial numbers less than or equal to M to a higher layer in ascending order of the serial number values.

The foregoing example is still used. The PDCP entity on the UE side has received PDCP PDUs whose serial number values are 1 and 4 and has not received PDCP PDUs whose serial number values are 2 and 3. For a PDCP PDU whose serial number value is 4 or 5, the packet discarding detection timer is started. If a PDCP PDU whose serial number is 2 or 3 is still not received after the packet discarding detection timer expires, PDCP SDUs included in PDCP PDUs whose serial number values are 1 and 4 are submitted to the higher layer.

S105: Submit PDCP SDUs included in all PDCP PDUs whose serial number values are greater than M and consecutive to the higher layer in ascending order of the serial number values.

The foregoing example is still used. It is assumed that, before the packet discarding detection timer expires, PDCP PDUs whose serial number values are 5, 6, 7, and 10 are received, and after the packet discarding detection timer expires, PDCP SDUs included in PDCP PDUs whose serial number values are 5 to 7 are submitted to the higher layer.

In this embodiment, a problem of data transmission delay may be avoided, where the data transmission delay is caused by that a PDCP keep waiting for a not-received PDCP PDU and cannot submit data to an upper layer for a long time.

In another embodiment of the present invention, the transmission method in all of the foregoing embodiments may further include:

when a stopping condition is met, stopping, by the PDCP entity on the UE side, the packet discarding detection timer, where the stopping condition includes at least: all missing second PDCP PDUs whose serial number values are less than the serial number M in the receiver window are successfully received.

It may be understood that, this embodiment of the present invention may also be a processing method of a PDCP entity on a network side, which is not limited in the present invention. This embodiment of the present invention may be used in an AM-mode RLC, and may be also used in a UM-mode RLC, which is not limited in the present invention.

In another embodiment of the present invention, the transmission method in all of the foregoing embodiments may further include:

maintaining, by the PDCP entity on the UE side, an unmatched number corresponding to an RLC entity specified by a network side, where the network side may specify all RLCs or may specify some RLCs.

The maintaining may include:

when the PDCP entity on the UE side receives a missing second PDCP PDU, and the missing second PDCP PDU is associated with the RLC entity specified by the network side, updating the corresponding unmatched number.

To be more specific, the PDCP entity on the UE side enables a calculation number for each specified RLC entity. For example, assuming that the specified RLC entity includes an RLC entity 1 on a network side and an RLC entity 2 on a network side, the PDCP entity on the UE side starts a counter 1 and associates the counter 1 with the RLC entity 1 on the network side, and starts a counter 2 and associates the counter 2 with the RLC entity 2 on the network side.

When the PDCP entity on the UE side receives a second PDCP PDU having a serial number value less than M, the PDCP on the UE side adds 1 to a corresponding counter. A value recorded by the counter is the foregoing unmatched number.

The foregoing example is still used. Assuming that the PDCP on the UE side receives the second PDCP PDU having a serial number value less than M, and the second PDCP PDU is sent by the RLC entity 2 on the network side, the PDCP on the UE side adds 1 to the counter 2.

In another embodiment of the present invention, configuration information of the foregoing counter may include an RLC entity corresponding to a counter and a counter threshold, and may be configured by the higher layer: a base station indicates, by using an RRC message, an RLC associated with a UE counter, and UE notifies, according to an indication, a PDCP entity to use the configuration information.

In another embodiment of the present invention, the foregoing method may further include the following step:

When a trigger condition is met, the PDCP entity on the UE side sends a PDCP matching status report to the network side.

The foregoing trigger condition may include at least one of a first trigger condition, a second trigger condition, and a third trigger condition.

The first trigger condition may include: an unmatched number is greater than a preset threshold, for example, a counter corresponding to a specified RLC is greater than or equal to the preset threshold.

To be more specific, a same threshold or different thresholds may be configured for different RLCs.

The second trigger condition may include: a difference between unmatched numbers is greater than a preset threshold. For example, a difference between a counter corresponding to one specified RLC and counters corresponding to one or more other specified RLCs exceeds the preset threshold.

The third trigger condition may include: a difference between an unmatched number and an unmatched number of a reference RLC configured by the network side are greater than or equal to a preset threshold.

Optionally, there may be one or more reference RLCs.

In another embodiment of the present invention, the foregoing preset threshold may be configured by the higher layer, for example, the base station may send the preset threshold to UE by using the RRC message, and after receiving the RRC message, the UE notifies the PDCP entity to use the preset threshold.

The PDCP matching status report may include at least one of the unmatched number (for example, a value of a counter associated with each specified RLC) corresponding to the RLC entity specified by the network side, the difference (for example, a difference of counters associated with all specified RLCs) between unmatched numbers, and the difference (for example, a difference between the counter associated with each specified RLC and a counter associated with an RLC of a base station) between an unmatched number and the unmatched number of the reference RLC configured by the network side.

After receiving the matching status report, the network side may adjust a offloading policy, for example, to enable one or more RLCs to transmit less data, and to enable another RLC or the other RLCs to transmit more data. A specific adjusting policy is not limited herein.

Optionally, after the trigger condition is met or the matching status report is sent, the counter may be zeroed out.

All of the foregoing embodiments of the present invention may be applied to an AM RLC scenario, and may be also applied to a UM RLC scenario.

In intra-station carrier aggregation, a status report does not need to be sent between base stations. However, in an inter-station carrier aggregation scenario, it may be considered that a status report is sent between a primary base station (MeNB) and a secondary base station (SeNB).

An embodiment provides a data transmission method, which may include at least the following step:

When detecting a not-successfully-sent RLC SDU, (an RLC entity of) a first base station sends a status report to (a PDCP entity of) a second base station, where the status report includes the not-successfully-sent RLC SDU and indicates that an RLC SDU, that is, a PDCP PDU, is not successfully sent. In this case, the PDCP of the second base station may send the PDCP PDU again.

The first base station may be a primary base station or a secondary base station, and the second base station may be a secondary base station or a primary base station.

To be more specific, when the PDCP PDU is sent again, the PDCP PDU may be sent by using the first base station, or may be sent by using the second base station.

Alternatively,

When detecting a successfully sent RLC SDU, (an RLC entity of) a first base station sends a status report to (a PDCP entity of) a second base station, where the status report includes the successfully sent RLC SDU.

After knowing the successfully sent RLC SDU (that is, a PDCP PDU), the PDCP entity of the second base station also knows PDCP PDUs that are not successfully sent. In this case, the PDCP of the second base station may retransmit the foregoing not-successfully-sent PDCP PDUs. In addition, when the PDCP PDUs are retransmitted, the PDCP PDUs may be sent by using the first base station, or may be sent by using the second base station.

It may be understood that, whether the PDCP of the second base station retransmits the not-successfully-sent PDUs may be determined by the second base station. For example, the second base station may adjust a subsequent offloading policy by means of feedback of the first base station, which is not limited in the present invention.

To be more specific, when an RLC PDU corresponding to the RLC SDU reaches the largest transmission times, (the RLC entity of) the first base station detects the not-successfully-sent RLC SDU.

When receiving feedback that the RLC PDU corresponding to the RLC SDU is successfully received, (the RLC entity of) the first base station detects the successfully sent RLC SDU.

To be more specific, the "sending a status report" may include performing sending by using an Xn interface between the first base station and the second base station.

This embodiment of the present invention may be used in combination with the embodiments shown in FIG. 10 to FIG. 12.

In conclusion, according to the present invention, a PDCP data transmission process in inter-station carrier aggregation is optimized, so that a volume of data temporarily stored by UE is reduced, delay caused when the UE temporarily stores data is reduced, and a problem that rates may be unmatched because multiple RLCs transmit data of a same PDCP is alleviated. Partial optimization may be also applied to a non-inter-station carrier aggregation scenario.

All of the foregoing embodiments of the present invention can be implemented alone or can be implemented in a combined manner, which is not limited in the present invention.

Corresponding to the data transmission method, embodiments of the present invention further provides a data transmission apparatus.

Figure 13:
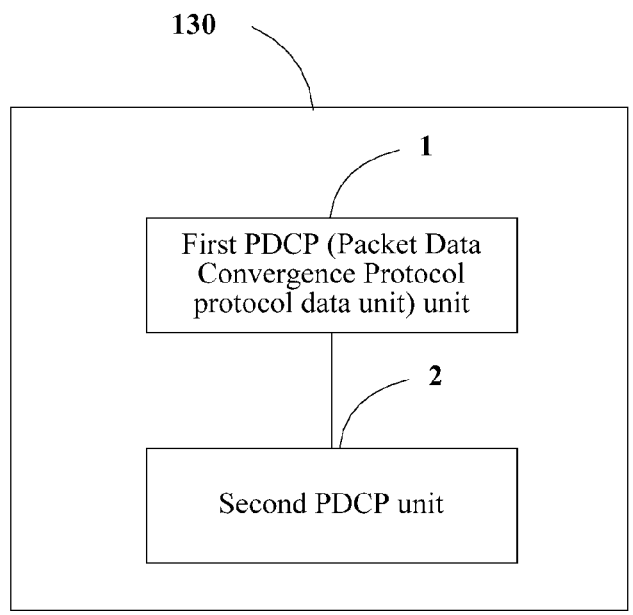
FIG. 13 is a schematic structural diagram of a data transmission apparatus according to an embodiment of the present invention.

FIG. 13 shows a structure of an apparatus 130, which may include:

a first PDCP unit 1, configured to perform lossless transmission on PDCP PDUs or PDCP SDUs, where each of the PDCP PDUs or SDUs is associated with one serial number.

In an aspect of performing lossless transmission on the PDCP SDUs, the first PDCP unit 1 may be specifically configured to submit all PDCP SDUs whose serial number values are consecutive to a higher layer in ascending order of the serial number values.

To be more specific, in an aspect of submitting all the PDCP SDUs whose serial number values are consecutive to the higher layer in ascending order of the serial number values, the first PDCP unit may be specifically configured to: when a lossless sending condition is met, submit all the PDCP SDUs whose serial number values are consecutive to the higher layer in ascending order of the serial number values.

For the lossless sending condition, refer to the above descriptions of this specification, and details are not described herein again.

In another embodiment of the present invention, still referring to FIG. 13, the foregoing apparatus 130 may further include a second PDPCP unit 2, configured to: when a lossy sending condition is met, submit all the PDCP SDUs to the higher layer in ascending order of the serial number values.

The lossy sending condition includes: a received PDCP PDU is submitted because of low-layer re-establishment, and a lossless indication is not received.

For more specific content, refer to the above descriptions of this specification, and details are not described herein again.

In another embodiment of the present invention, the data transmission apparatus 130 in all of the foregoing embodiments may further include: a first receiving unit, configured to receive the lossless indication.

For related content of the lossless indication, refer to the above descriptions of this specification, and details are not described herein again.

In an aspect of performing lossless transmission on the PDCP PDUs, the first PDCP unit 1 may be specifically configured to:

after receiving a PDCP re-establishment indication, determine whether a lossless indication is received, where the lossless indication is used to indicate lossless transmission; and when it is determined that the lossless indication has been received, submit PDCP PDUs that have been associated with serial numbers before re-establishment to a lower layer in ascending order of serial number values and by starting from a PDCP PDU that has the smallest serial number value and whose successful transmission has not been acknowledged by the lower layer before re-establishment; or when it is determined that the lossless indication has been received, submit, to a lower layer in ascending order of serial number values, all PDCP PDUs that have been associated with serial numbers SNs before re-establishment, but whose successful transmission has not been acknowledged by the lower layer.

In another embodiment of the present invention, the data transmission apparatus 130 in all of the foregoing embodiments may further include: a third PDCP unit, configured to: when it is determined that the lossless indication is not received, perform lossy transmission, where the lossy transmission may include:

submitting all PDCP PDUs that have been associated with SNs before re-establishment to the lower layer in ascending order of serial number values and by starting from a PDCP PDU that is after a PDCP PDU that has the largest serial number value and whose successful transmission has been acknowledged by the lower layer; or discarding all the PDCP PDUs that have been associated with the SNs before re-establishment; or discarding all PDCP PDUs that have been sent to the lower layer before re-establishment; or discarding all PDCP SDUs that are received from a higher layer before re-establishment.

For related content of the lossy transmission, refer to the above descriptions of this specification, and details are not described herein again.

In another embodiment of the present invention, the data transmission apparatus 130 in all of the foregoing embodiments may further include: a second receiving unit, configured to receive a successful sending acknowledgment indication sent by the lower layer, where each PDCP PDU successfully sent by the lower layer corresponds to one successful sending acknowledgment indication.

In another embodiment of the present invention, the data transmission apparatus in all of the foregoing embodiments may further include: a discarding unit, configured to discard a PDCP PDU whose successful transmission has been acknowledged by the lower layer, and a PDCP SDU corresponding to the PDCP PDU whose successful transmission has been acknowledged by the lower layer.

Figure 14:
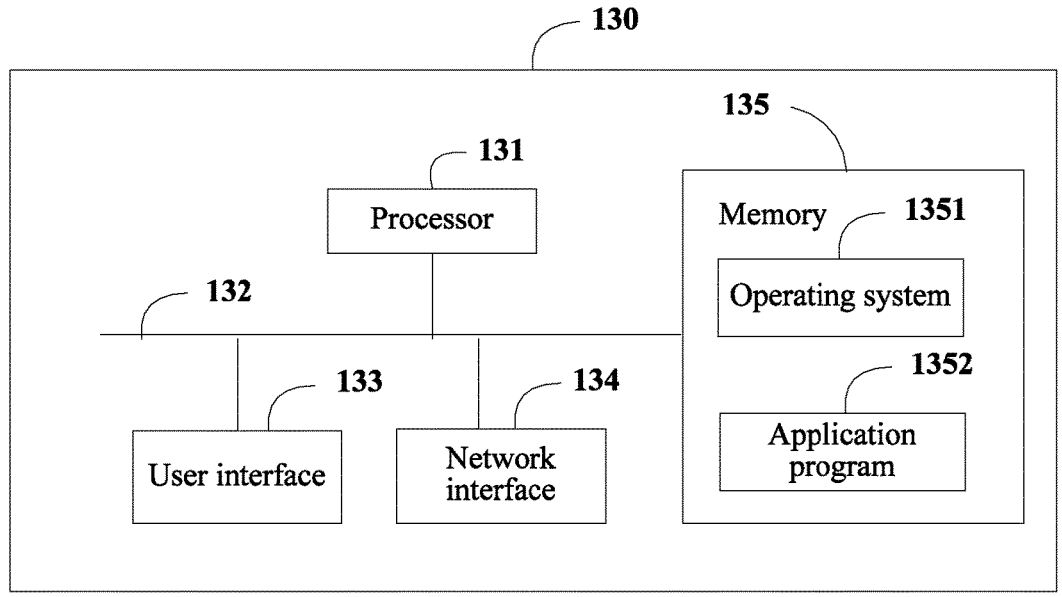
FIG. 14 is another schematic structural diagram of a data transmission apparatus according to an embodiment of the present invention.

FIG. 14 shows a hardware structure of the foregoing data transmission apparatus 130, which may include: at least one processor 131, for example, a CPU, at least one network interface 134 or another user interface 133, a memory 135, and at least one communications bus 132. The communications bus 132 is configured to implement connection and communication of these components. The transmission timing apparatus 130 optionally includes the user interface 133, a keyboard, or a pointer device, for example, a trackball (trackball), a touch panel, or a touch display screen. The memory 135 may include a high-speed RAM memory, and may also further include a non-volatile memory (non-volatile memory), for example, at least one magnetic disk storage. The memory 135 may optionally include at least one storage apparatus far away from the processor 131.

In some implementation manners, the memory 135 may store the following elements, an executable module or a data structure, or subsets thereof, or extended sets thereof:

an operating system 1351, including various system programs and used to implement various basic services and process a hardware-based task; and an application program module 1352, including various application programs and used to implement various application services.

The application program module 1352 includes, but is not limited to, a first PDCP unit 1 and a first PDCP unit 2.

For specific implementation of each module in the application program module 1352, refer to corresponding modules in the embodiment shown in FIG. 13, and details are not described herein again.

In this embodiment of the present invention, by invoking a program or an instruction stored in the memory 135, the processor 131 is configured to:

perform lossless transmission on PDCP PDUs or PDCP SDUs, where each of the PDCP PDUs or SDUs is associated with one serial number.

In addition, the foregoing processor 131 may be also configured to implement another step and details of each step of the data transmission method in FIG. 6 to FIG. 8 described in the method part of this specification, and details are not described herein again.

The CPU and the memory in all of the foregoing embodiments may be integrated into a same chip, and may also be two independent components.

Figure 15:
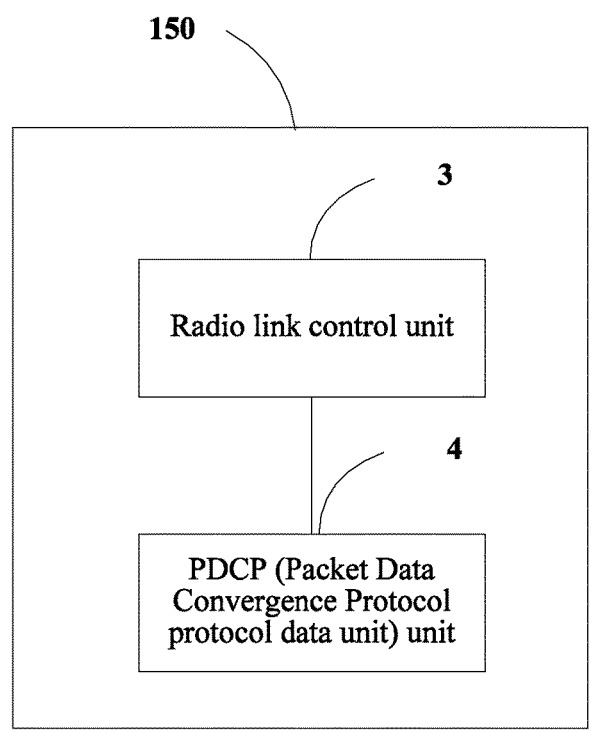
FIG. 15 is still another schematic structural diagram of a data transmission apparatus according to an embodiment of the present invention.

In another embodiment of the present invention, referring to FIG. 15, the data transmission apparatus 150 may include at least:

an RLC unit 3, configured to: after a successfully sent RLC SDU is detected, feed a successful sending acknowledgment indication back, to notify a PDCP unit that the PDCP PDU is successfully sent; and a PDCP unit 4, configured to receive the successful sending acknowledgment indication fed back by an RLC entity, and discard a PDCP SDU corresponding to the at least one PDCP PDU and a corresponding PDCP PDU.

For specific content, refer to the above descriptions of this specification, and details are not described herein again.

Figure 16:
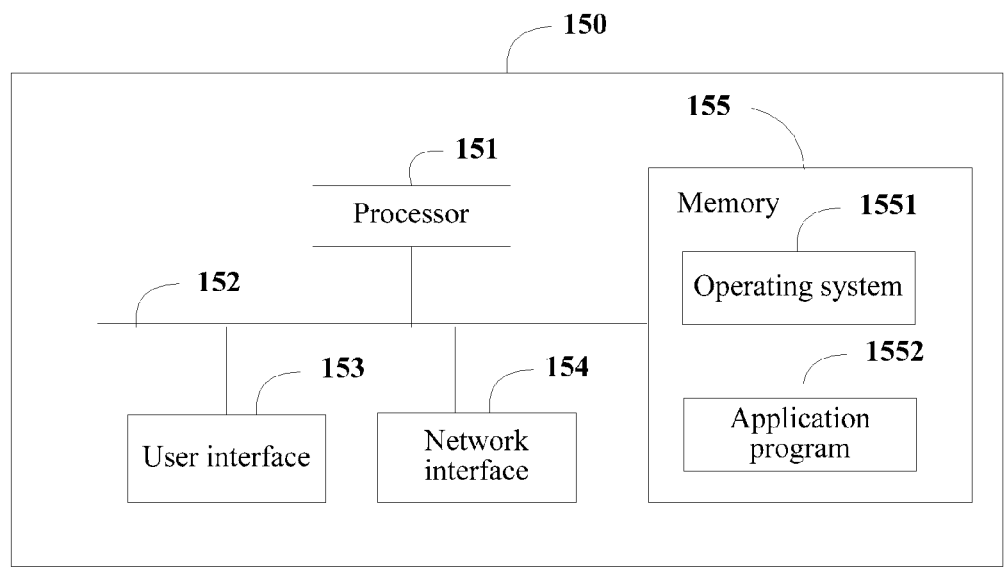
FIG. 16 is still another schematic structural diagram of a data transmission apparatus according to an embodiment of the present invention.

FIG. 16 shows a hardware structure of the foregoing data transmission apparatus 150, which may include: at least one processor 151, for example, a CPU, at least one network interface 154 or another user interface 153, a memory 155, and at least one communications bus 152. The communications bus 152 is configured to implement connection and communication of these components. The transmission timing apparatus 150 optionally includes the user interface 153, a keyboard, or a pointer device, for example, a trackball (trackball), a touch panel, or a touch display screen. The memory 155 may include a high-speed RAM memory, and may also further include a non-volatile memory (non-volatile memory), for example, at least one magnetic disk storage. The memory 155 may optionally include at least one storage apparatus far away from the processor 151.

In some implementation manners, the memory 155 may store the following elements, an executable module or a data structure, or subsets thereof, or extended sets thereof:

an operating system 1551, including various system programs and used to implement various basic services and process a hardware-based task; and an application program module 1552, including various application programs and used to implement various application services.

The application program module 1552 includes, but is not limited to, an RLC unit 3 and a PDCP unit 4.

For specific implementation of each module in the application program module 1552, refer to corresponding modules in the embodiment shown in FIG. 15, and details are not described herein again.

In this embodiment of the present invention, by invoking a program or an instruction stored in the memory 155, the processor 151 is configured to:

after a successfully sent RLC SDU is detected, feed a successful sending acknowledgment indication back, to indicate to a PDCP entity that the PDCP PDU is successfully sent; or receive a successful sending acknowledgment indication fed back by an RLC entity, where the successful sending acknowledgment indication is used to indicate at least one PDCP PDU (RLC SDU) successfully sent by a lower layer, and discard a PDCP SDU corresponding to the at least one PDCP PDU and a corresponding PDCP PDU.

In addition, the foregoing processor 151 may be also configured to implement another step and details of each step of the data transmission method in FIG. 9 described in the method part of this specification, and details are not described herein again.

The CPU and the memory in all of the foregoing embodiments may be integrated into a same chip, and may also be two independent components.

Figure 17:
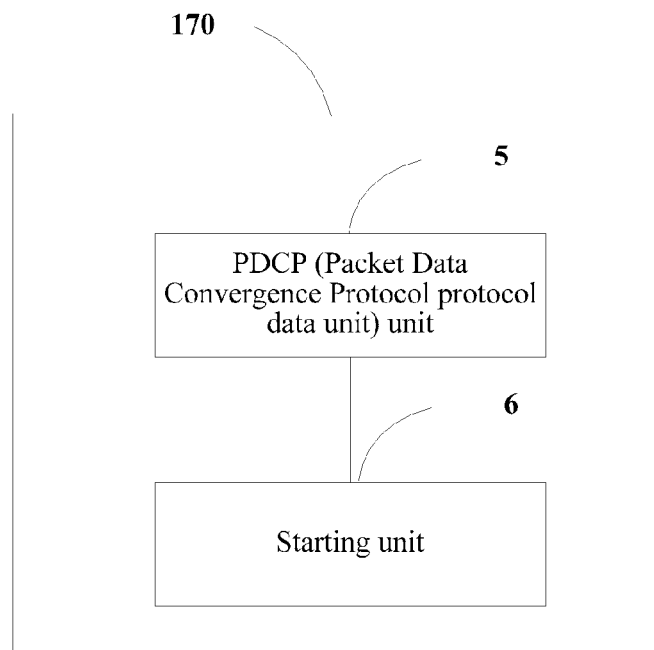
FIG. 17 is still another schematic structural diagram of a data transmission apparatus according to an embodiment of the present invention.

In another embodiment of the present invention, referring to FIG. 17, the data transmission apparatus 170 may include at least:

a PDCP unit 5, configured to receive a first PDCP PDU from a lower layer, where it is assumed that a serial number value that the first PDCP PDU is associated with is M; and a starting unit 6, configured to: when a condition of starting a packet discarding detection timer is met, start the packet discarding detection timer, where the condition of starting the packet discarding detection timer includes: it is detected that the first PDCP PDU is a non-consecutive PDCP PDU in a receiver window, and being non-consecutive includes: at least one second PDCP PDU having a serial number less than the serial number M is not received.

Figure 18:
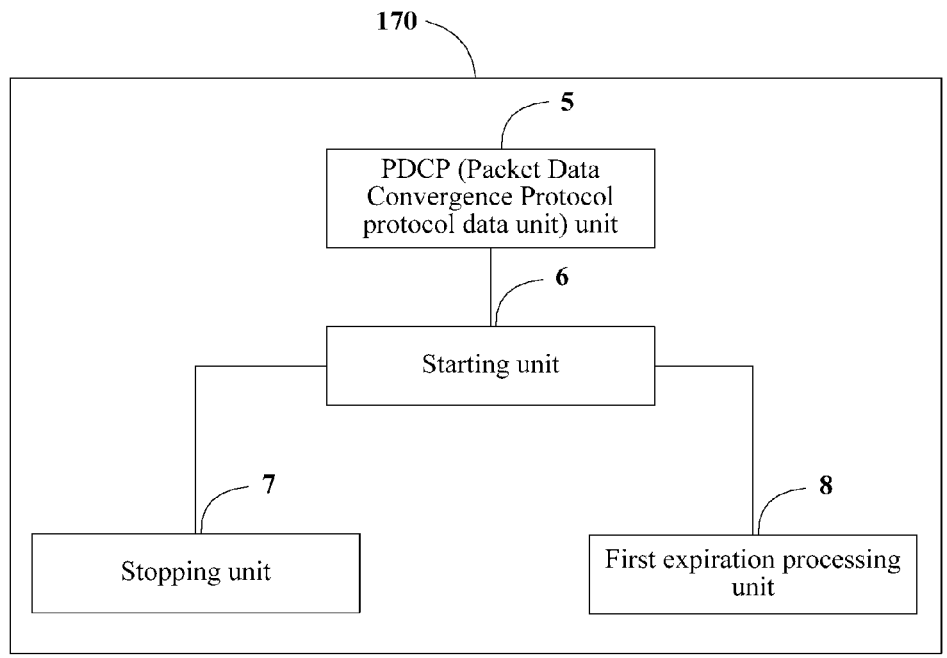
FIG. 18 is still another schematic structural diagram of a data transmission apparatus according to an embodiment of the present invention.
Figure 19:
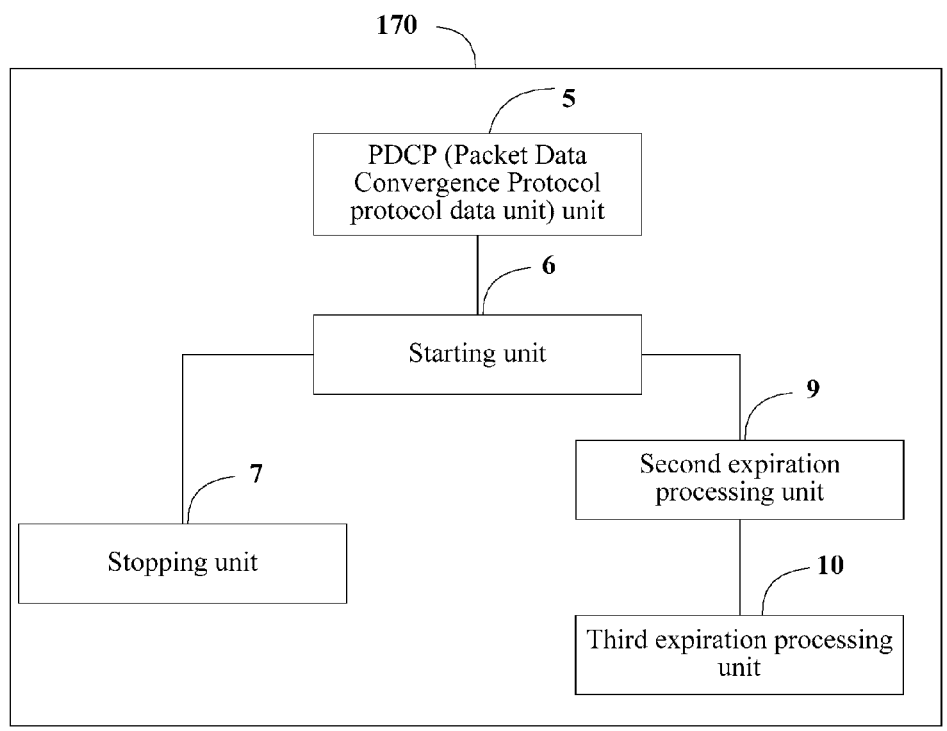
FIG. 19 is still another schematic structural diagram of a data transmission apparatus according to an embodiment of the present invention.

In another embodiment of the present invention, referring to FIG. 18 or 19, the foregoing data transmission apparatus 170 may further include:

a stopping unit 7, configured to: when a stopping condition is met, stop the packet discarding detection timer, where the stopping condition includes at least: all missing second PDCP PDUs whose serial number values are less than the serial number M in the receiver window are successfully received.

In another embodiment of the present invention, referring to FIG. 18 or FIG. 19, the foregoing data transmission apparatus 170 may further include:

a first expiration processing unit 8, configured to: when the packet discarding detection timer expires, generate a PDCP status report and send the PDCP status report to a network side. For related introduction of the PDCP status report, refer to the above descriptions of this specification, and details are not described herein again.

Alternatively, the foregoing data transmission apparatus 170 further includes:

a second expiration processing unit 9, configured to: when the packet discarding detection timer expires, submit PDCP SDUs included in PDCP PDUs having serial numbers less than or equal to M to a higher layer in ascending order of the serial number values; and a third expiration processing unit 10, configured to submit PDCP SDUs included in all PDCP PDUs whose serial number values are greater than M and consecutive to the higher layer in ascending order of the serial number values.

In another embodiment of the present invention, the condition of starting the packet discarding detection timer further includes: the packet discarding detection timer is not running.

For related introduction of the packet discarding detection timer, refer to the above descriptions of this specification, and details are not described herein again.

In another embodiment of the present invention, the foregoing data transmission apparatus 170 may further include:

a maintenance unit, configured to maintain an unmatched number corresponding to an RLC entity specified by the network side.

The maintaining includes:

when a PDCP entity on a UE side receives a missing PDCP PDU, and the missing PDCP PDU is associated with the RLC entity specified by the network side, updating the corresponding unmatched number.

For related introduction, refer to the above descriptions of this specification, and details are not described herein again.

The foregoing data transmission apparatus 170 may further include:

a PDCP matching status report sending unit, configured to: when a trigger condition is met, send, by the PDCP entity on the UE side, a PDCP matching status report to the network side, where the trigger condition includes at least one of the following: an unmatched number is greater than a preset threshold, a difference between unmatched numbers is greater than a preset threshold, and a difference between an unmatched number and an unmatched number of a reference RLC configured by the network side are greater than or equal to a preset threshold; and the PDCP matching status report includes at least one of the unmatched number corresponding to the RLC entity specified by the network side, the difference between unmatched numbers, and the difference between an unmatched number and the unmatched number of the reference RLC configured by the network side.

For related introduction, refer to the above descriptions of this specification, and details are not described herein again.

Figure 20:
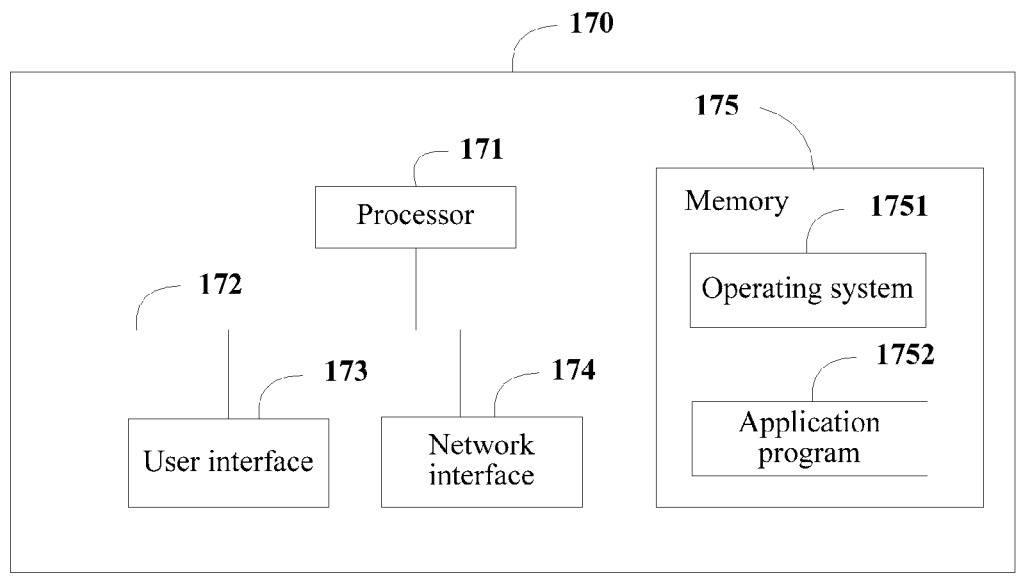
FIG. 20 is still another schematic structural diagram of a data transmission apparatus according to an embodiment of the present invention.

FIG. 20 shows a hardware structure of the foregoing data transmission apparatus 170, which may include: at least one processor 171, for example, a CPU, at least one network interface 174 or another user interface 173, a memory 175, and at least one communications bus 172. The communications bus 172 is configured to implement connection and communication of these components. The transmission timing apparatus 170 optionally includes the user interface 173, a keyboard, or a pointer device, for example, a trackball (trackball), a touch panel, or a touch display screen. The memory 175 may include a high-speed RAM memory, and may also further include a non-volatile memory (non-volatile memory), for example, at least one magnetic disk storage. The memory 175 may optionally include at least one storage apparatus far away from the processor 171.

In some implementation manners, the memory 175 may store the following elements, an executable module or a data structure, or subsets thereof, or extended sets thereof:

an operating system 1751, including various system programs and used to implement various basic services and process a hardware-based task; and an application program module 1752, including various application programs and used to implement various application services.

The application program module 1752 includes, but is not limited to, an RLC unit 3 and a PDCP unit 4.

For specific implementation of each module in the application program module 1752, refer to corresponding modules in the embodiment shown in FIG. 17, and details are not described herein again.

In this embodiment of the present invention, by invoking a program or an instruction stored in the memory 175, the processor 171 is configured to:

receive a first PDCP PDU from a lower layer, and when a condition of starting a packet discarding detection timer is met, start the packet discarding detection timer.

In addition, the foregoing processor 171 may be also configured to implement another step and details of each step of the data transmission method in FIG. 10 to FIG. 12 described in the method part of this specification, and details are not described herein again.

The CPU and the memory in all of the foregoing embodiments may be integrated into a same chip, and may also be two independent components.

In another embodiment of the present invention, another structure of the foregoing data transmission apparatus (a first base station) may include:

a first report sending unit, configured to: when a not-successfully-sent RLC SDU is detected, send a status report to (a PDCP entity of) a second base station, where the status report includes the not-successfully-sent RLC SDU and indicates that an RLC SDU, that is, a PDCP PDU is not successfully sent. In this case, a PDCP of the second base station may send the PDCP PDU again.

Alternatively, the another structure of the foregoing data transmission apparatus may include:

a second report sending unit, configured to: when a successfully sent RLC SDU is detected, send a status report to (a PDCP entity of) a second base station, where the status report includes the successfully sent RLC SDU.

For related content, refer to the above descriptions of this specification, and details are not described herein again.

Figure 21:
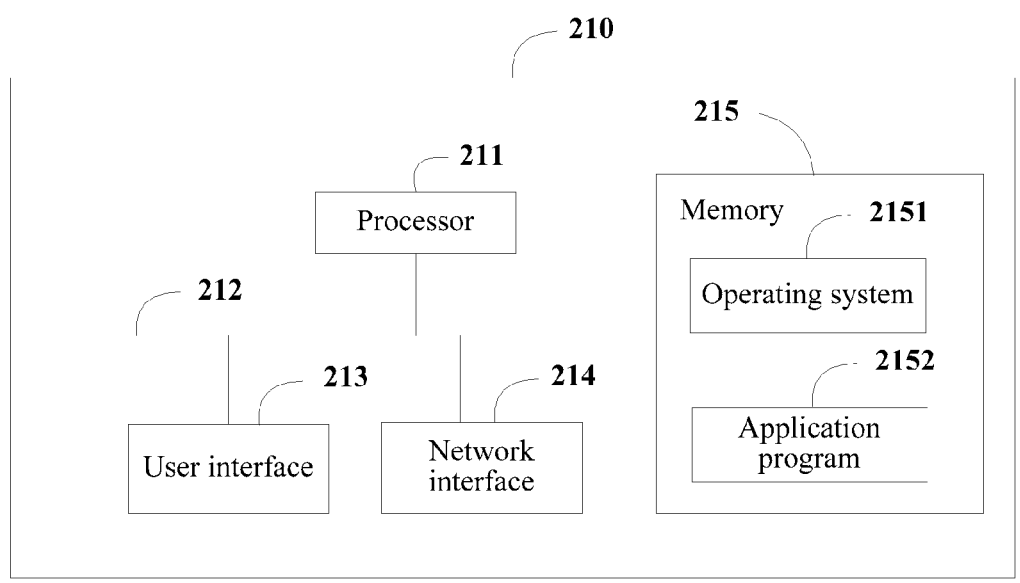
FIG. 21 is still another schematic structural diagram of a data transmission apparatus according to an embodiment of the present invention.

FIG. 21 shows a hardware structure of the foregoing data transmission apparatus (a first base station) 210, which may include: at least one processor 211, for example, a CPU, at least one network interface 214 or another user interface 213, a memory 215, and at least one communications bus 212. The communications bus 212 is configured to implement connection and communication of these components. The transmission timing apparatus 210 optionally includes the user interface 213, a keyboard, or a pointer device, for example, a trackball (trackball), a touch panel, or a touch display screen. The memory 215 may include a high-speed RAM memory, and may also further include a non-volatile memory (non-volatile memory), for example, at least one magnetic disk storage. The memory 215 may optionally include at least one storage apparatus far away from the processor 211.

In some implementation manners, the memory 215 may store the following elements, an executable module or a data structure, or subsets thereof, or extended sets thereof:

an operating system 2151, including various system programs and used to implement various basic services and process a hardware-based task; and an application program module 2152, including various application programs and used to implement various application services.

The application program module 2152 includes, but is not limited to, a first report sending unit or a second report sending unit.

In this embodiment of the present invention, by invoking a program or an instruction stored in the memory 215, the processor 211 is configured to:

when a not-successfully-sent RLC SDU is detected, send a status report to (a PDCP entity of) a second base station, where the status report includes the not-successfully-sent RLC SDU and indicates that an RLC SDU, that is, a PDCP PDU is not successfully sent. In this case, a PDCP of the second base station may send the PDCP PDU again.

Alternatively, the processor 211 may be configured to:

when a successfully sent RLC SDU is detected, send a status report to (a PDCP entity of) a second base station, where the status report includes the successfully sent RLC SDU.

In addition, the foregoing processor 211 may be also configured to implement another step and details of each step that can be implemented by the first base station described in the method part of this specification, and details are not described herein again.

The CPU and the memory in all of the foregoing embodiments may be integrated into a same chip, and may also be two independent components.

The embodiments in this specification are all described in a progressive manner, for same or similar parts in the embodiments, reference may be made to these embodiments, and each embodiment focuses on a difference from other embodiments. The apparatus provided in the embodiments is described relatively simply because it corresponds to the method provided in the embodiments, and for portions related to those of the method, reference may be made to the description of the method.

It should be noted that in this specification, relational terms such as first and second are only used to distinguish one entity or operation from another, and do not necessarily require or imply that any actual relationship or sequence exists between these entities or operations. Moreover, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element preceded by "includes a . . . " does not, without more constraints, preclude the existence of additional identical elements in the process, method, article, or apparatus that includes the element.

Through the foregoing description of the embodiments, it may be clearly understood by a person skilled in the art that the present invention can be implemented by software plus necessary universal hardware, where the universal hardware includes a universal integrated circuit, a universal CPU, a universal memory, a universal device, and the like, and definitely may also be implemented by application-specific hardware, like an application-specific integrated circuit, an application-specific CPU, an application-specific memory, an application-specific device, and the like, but in many cases, the former one is preferred. Based on such understandings, the essence of the technical solutions of the present invention or the part that makes contributions can be embodied in a software product. The computer software product may be stored in a readable storage medium such as a USB flash disk, a mobile hard disk, a read-only memory (ROM), a random access memory (RAM), a magnetic disk, or an optical disc, where the storage medium incorporates several instructions causing a computer device (such as a personal computer, a server, or a network device) to perform the method specified in each embodiment of the present invention.

The embodiments provided above are described to enable a person skilled in the art to implement or use the present invention. Various modifications to the embodiments are obvious to the person skilled in the art, and general principles defined in this specification can be implemented in other embodiments without departing from the spirit or scope of the present invention. Therefore, the present invention will not be limited to the embodiments described in this specification but extends to the widest scope that complies with the principles and novelty provided in this specification.

What is claimed is:

1. A data transmission method, comprising:
performing, by a Packet Data Convergence Protocol (PDCP) entity on a user equipment (UE) side, lossless transmission on PDCP protocol data units (PDUs), wherein each of the PDCP PDUs is associated with a serial number,
after receiving a PDCP re-establishment indication, determining, by the PDCP entity on the UE side, whether a lossless indication is received, wherein the lossless indication indicates lossless transmission; and
in response to determining that the lossless indication has been received, submitting, by the PDCP entity on the UE side, PDCP PDUs that have been associated with serial numbers before re-establishment to a lower layer in ascending order of serial number values and by starting from a PDCP PDU that has a smallest serial number value and whose successful transmission has not been acknowledged by the lower layer before re-establishment.

2. The method according to claim 1, further comprising:
in response to determining that the lossless indication is not received, performing, by the PDCP entity on the UE side, lossy transmission, wherein the lossy transmission comprises:
submitting all PDCP PDUs that have been associated with serial numbers (SNs) before re-establishment to the lower layer in ascending order of serial number values and by starting from a PDCP PDU that is after a PDCP PDU that has the largest serial number value and whose successful transmission has been acknowledged by the lower layer; or
discarding all the PDCP PDUs that have been associated with the SNs before re-establishment; or discarding all PDCP PDUs that have been sent to the lower layer before re-establishment; or discarding all PDCP SDUs that are received from a higher layer before re-establishment.

3. The method according to claim 1, further comprising:
receiving a successful sending acknowledgment indication sent by the lower layer, wherein each PDCP PDU successfully sent by the lower layer corresponds to one successful sending acknowledgment indication.

4. The method according to claim 1, further comprising:
receiving the lossless indication.

5. A data transmission method, comprising:
receiving, by a Packet Data Convergence Protocol (PDCP) entity on a user equipment (UE) side, a first PDCP protocol data unit (PDU) from a lower layer, wherein a first serial number value is associated with the first PDCP PDU; and when a condition of starting a packet discarding detection timer is met, starting, by the PDCP entity on the UE side, the packet discarding detection timer, wherein the condition of starting the packet discarding detection timer comprises: detecting whether the first PDCP PDU is a non-consecutive PDCP PDU in a receiver window, and being non-consecutive comprises: determining that at least one second PDCP PDU having a second serial number value less than the first serial number value is not received.

6. The method according to claim 5, further comprising:
when the packet discarding detection timer expires, generating, by the PDCP entity on the UE side, a PDCP status report and sending the PDCP status report to a network side; and submitting PDCP service data units (SDUs) comprised in all PDCP PDUs whose serial number values are greater than the first serial number value and consecutive to the higher layer in ascending order of the serial number values.

7. The method according to claim 5, further comprising:
maintaining, by the PDCP entity on the UE side, an unmatched number corresponding to a radio link control (RLC) entity specified by a network side, wherein the maintaining comprises:
when the PDCP entity on the UE side receives a missing PDCP PDU, and the missing PDCP PDU is associated with the RLC entity specified by the network side, updating the corresponding unmatched number.

8. The method according to claim 7, further comprising:
when a trigger condition is met, sending, by the PDCP entity on the UE side, a PDCP matching status report to the network side,
wherein the trigger condition comprises at least one of the following: an unmatched number is greater than a preset threshold, a difference between unmatched numbers is greater than a preset threshold, and a difference between an unmatched number and an unmatched number of a reference RLC configured by the network side are greater than or equal to a preset threshold; and
wherein the PDCP matching status report comprises at least one of the unmatched number corresponding to the RLC entity specified by the network side, the difference between unmatched numbers, and the difference between an unmatched number and the unmatched number of the reference RLC configured by the network side.

9. The method according to claim 5, further comprising:
when the packet discarding detection timer expires, submitting, by the PDCP entity on the UE side, PDCP service data units (SDUs) comprised in PDCP PDUs having serial number values less than or equal to the first serial number value to a higher layer in ascending order of the serial number values; and
submitting PDCP SDUs comprised in all PDCP PDUs whose serial number values are greater than the first serial number value and consecutive to the higher layer in ascending order of the serial number values.

10. A data transmission apparatus, comprising:
a first Packet Data Convergence Protocol (PDCP) entity on a user equipment (UE) side, configured to:
perform lossless transmission on PDCP protocol data units (PDUs), wherein each of the PDCP PDUs is associated with a serial number,
after receiving a PDCP re-establishment indication, determine whether a lossless indication is received, wherein the lossless indication is used to indicate lossless transmission; and
in response to determining that the lossless indication has been received, submit PDCP PDUs that have been associated with serial numbers before re-establishment to a lower layer in ascending order of serial number values and by starting from a PDCP PDU that has the smallest serial number value and whose successful transmission has not been acknowledged by the lower layer before re-establishment.

11. The apparatus according to claim 10, further comprising:
a second PDCP entity on the UE side, configured to: when it is determined that the lossless indication is not received, perform lossy transmission, wherein the lossy transmission comprises:
submitting all PDCP PDUs that have been associated with serial numbers (SNs) before re-establishment to the lower layer in ascending order of serial number values and by starting from a PDCP PDU that is after a PDCP PDU that has the largest serial number value and whose successful transmission has been acknowledged by the lower layer; or
discarding all the PDCP PDUs that have been associated with the SNs before re-establishment; or
discarding all PDCP PDUs that have been sent to the lower layer before re-establishment; or
discarding all PDCP SDUs that are received from a higher layer before re-establishment.

12. The apparatus according to claim 10, further comprising:
a third PDCP entity on the UE side, configured to receive a successful sending acknowledgment indication sent by the lower layer, wherein each PDCP PDU successfully sent by the lower layer corresponds to one successful sending acknowledgment indication.

13. The apparatus according to claim 10, wherein the first PDCP entity on the UE side is further configured to receive the lossless indication.

14. A data transmission apparatus, comprising:
a Packet Data Convergence Protocol (PDCP) entity on a user equipment (UE) side, configured to receive a first PDCP protocol data unit (PDU) from a lower layer, wherein a first serial number value is associated with the first PDCP PDU; and
a processor, configured to: when a condition of starting a packet discarding detection timer is met, start the packet discarding detection timer, wherein the condition of starting the packet discarding detection timer comprises: detecting whether the first PDCP PDU is a non-consecutive PDCP PDU in a receiver window, and being non-consecutive comprises: determining that at least one second PDCP PDU having a second serial number value less than the first serial number value is not received.

15. The apparatus according to claim 14, wherein the processor is further configured to:
when the packet discarding detection timer expires, generate a PDCP status report and send the PDCP status report to a network side; and
submit PDCP service data units (SDUs) comprised in all PDCP PDUs whose serial number values are greater than the first serial number value and consecutive to the higher layer in ascending order of the serial number values.

16. The apparatus according to claim 15, wherein the processor is further configured to:
maintain an unmatched number corresponding to a radio link control (RLC) entity specified by the network side, wherein the maintaining comprises:
when a PDCP entity on the UE side receives a missing PDCP PDU, and the missing PDCP PDU is associated with the RLC entity specified by the network side, updating the corresponding unmatched number.

17. The apparatus according to claim 16, further comprising:
a transmitter, configured to: when a trigger condition is met, send, by the PDCP entity on the UE side, a PDCP matching status report to the network side,
wherein the trigger condition comprises at least one of the following: an unmatched number is greater than a preset threshold, a difference between unmatched numbers is greater than a preset threshold, and a difference between an unmatched number and an unmatched number of a reference RLC configured by the network side are greater than or equal to a preset threshold; and
wherein the PDCP matching status report comprises at least one of the unmatched number corresponding to the RLC entity specified by the network side, the difference between unmatched numbers, and the difference between an unmatched number and the unmatched number of the reference RLC configured by the network side.

18. The apparatus according to claim 14, wherein the processor is further configured to:
when the packet discarding detection timer expires, submit PDCP service data units (SDUs) comprised in PDCP PDUs having serial number values less than or equal to the first serial number value to a higher layer in ascending order of the serial number values; and
submit PDCP SDUs comprised in all PDCP PDUs whose serial number values are greater than M and consecutive to the higher layer in ascending order of the serial number values.

19. A data transmission apparatus, comprising:
a processor; and
a memory, wherein the processor performs, by running a software program stored in the memory and invoking data stored in the memory, at least the following steps:
performing lossless transmission on Packet Data Convergence Protocol (PDCP) protocol data units (PDUs), wherein each of the PDCP PDUs is associated with a serial number,
after receiving a PDCP re-establishment indication, determining whether a lossless indication is received, wherein the lossless indication is used to indicate lossless transmission; and
in response to determining that the lossless indication has been received, submitting PDCP PDUs that have been associated with serial numbers before re-establishment to a lower layer in ascending order of serial number values and by starting from a PDCP PDU that has the smallest serial number value and whose successful transmission has not been acknowledged by the lower layer before re-establishment.

20. A data transmission apparatus, comprising:
a processor; and
a memory, wherein the processor performs, by running a software program stored in the memory and invoking data stored in the memory, at least the following step:
receiving a first Packet Data Convergence Protocol (PDCP) protocol data unit (PDU) from a lower layer, wherein a first serial number value is associated with the first PDCP PDU; and
when a condition of starting a packet discarding detection timer is met, starting, by a PDCP entity on a user equipment (UE) side, the packet discarding detection timer, wherein the condition of starting the packet discarding detection timer comprises: detecting whether the first PDCP PDU is a non-consecutive PDCP PDU in a receiver window, and being non-consecutive comprises: determining that at least one second PDCP PDU having a serial number value less than the first serial number value is not received.

* * * * *